(12) United States Patent
Sivashanmugam et al.

(10) Patent No.: US 10,089,626 B2
(45) Date of Patent: Oct. 2, 2018

(54) SYSTEMS AND METHODS FOR AUTHENTICATING USER IDENTITIES IN NETWORKED COMPUTER SYSTEMS

(71) Applicant: The Toronto-Dominion Bank, Toronto (CA)

(72) Inventors: Prabaharan Sivashanmugam, Farmington Hills, MI (US); Lauren Van Heerden, Bedford, NH (US); Michael D. Cummins, Pickering (CA); Orin Del Vecchio, Richmond Hills (CA); Gunalan Nadarajah, Milton (CA); Edward Lounsbury, Toronto (CA); Paul Mon-Wah Chan, Markham (CA); Jonathan K. Barnett, Oakville (CA); Ashraf Metwalli, Toronto (CA); Jakub Danielak, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 272 days.

(21) Appl. No.: 14/747,895

(22) Filed: Jun. 23, 2015

(65) Prior Publication Data
US 2016/0028715 A1    Jan. 28, 2016

Related U.S. Application Data

(60) Provisional application No. 62/016,012, filed on Jun. 23, 2014, provisional application No. 62/016,017, filed on Jun. 23, 2014.

(51) Int. Cl.
*G06F 7/04* (2006.01)
*G06Q 20/40* (2012.01)
(Continued)

(52) U.S. Cl.
CPC ......... *G06Q 20/401* (2013.01); *G06Q 20/202* (2013.01); *G06Q 20/38215* (2013.01); *H04L 63/083* (2013.01); *H04L 63/0861* (2013.01)

(58) Field of Classification Search
CPC . H04L 63/083; H04L 63/0861; G06Q 20/401; G06Q 20/38215; G06Q 20/202
See application file for complete search history.

(56) References Cited

U.S. PATENT DOCUMENTS

| 7,292,996 B2 * | 11/2007 | Nobrega | G06Q 20/02 705/39 |
| 2012/0066504 A1 * | 3/2012 | Hird | G06F 21/31 713/183 |

(Continued)

*Primary Examiner* — Khoi V Le
(74) *Attorney, Agent, or Firm* — Duane Morris LLP

(57) ABSTRACT

The disclosed embodiments include methods, systems, system terminals, and point-of-sale terminals for authenticating a user. The disclosed embodiments include, for example, a method for receiving, by one or more processors, authentication data from an authentication network, the authentication data including an authentication code identifying an authentication transaction associated with an authenticating partner system. The method may also include validating, by the one or more processors, the authentication data, the validating comprising comparing the authentication data with validation data corresponding to a prior authentication event associated with the user. The method may also include generating, by the one or more processors, validation information based on the validating, the validation information comprising a determination whether to validate the user for the authentication transaction. The method may also include providing, by the one or more processors, the validation information to the authentication network.

17 Claims, 11 Drawing Sheets

(51) Int. Cl.
*G06Q 20/20* (2012.01)
*G06Q 20/38* (2012.01)
*H04L 29/06* (2006.01)

(56) References Cited

U.S. PATENT DOCUMENTS

| | | | |
|---|---|---|---|
| 2012/0129492 A1* | 5/2012 | Mechaley, Jr. | G06Q 20/027 455/411 |
| 2012/0166344 A1* | 6/2012 | Cheng | G06Q 20/20 705/75 |
| 2014/0289833 A1* | 9/2014 | Briceno | H04L 63/08 726/7 |
| 2015/0128240 A1* | 5/2015 | Richards | H04L 63/0861 726/7 |

\* cited by examiner

SYSTEMS AND METHODS FOR AUTHENTICATING USER IDENTITIES IN NETWORKED COMPUTER SYSTEMS

CROSS-REFERENCE TO RELATED APPLICATION

This application claims the benefit of priority to U.S. Provisional Patent Application No. 62/016,012, filed Jun. 23, 2014, and to U.S. Provisional Patent Application No. 62/016,017, filed Jun. 23, 2014, the disclosures of which are expressly incorporated herein by reference in their entireties.

BACKGROUND

Technical Field

The present disclosure generally relates to systems, methods, and apparatuses for authenticating identities of users in networked computer systems, and for example, and without limitation, to systems and methods for authenticating identities of users in networked computing systems that facilitate services relating to accounts and/or transactions.

Background

Today, many financial and non-financial transactions require users to establish their identity or other personal characteristics prior to approval. Users typically establish their identities through paper documents, passwords, and rarely-used items. In the modern digital age, it can be cumbersome for users to keep track of a wide variety of paper documents and physical items for proving their identity and personal attributes on a routine basis. Moreover, conventional practices for opening a new financial account typically require a user to personally visit a brick and mortar financial institution to establish his or her identity by providing identification documents, such as a driver's license, utility bills, and other forms of documentation to a representative of the institution.

The disclosed embodiments include methods and systems to authenticate users in an accurate, efficient, and trustworthy manner.

SUMMARY

The disclosed embodiments include systems and methods for authenticating users.

The disclosed embodiments include, for example, a method for authenticating a user. The method may include providing, by one or more processors, an authentication transaction request to a first authentication partner system, the authentication transaction request corresponding to an authentication transaction. The method may also include receiving, by the one or more processors, an authentication code from a first authentication partner system, the authentication code identifying the authentication transaction. The method may also include providing, by the one or more processors, authentication data to an authentication terminal in communication with an authentication network, the authentication data including the authentication code.

The disclosed embodiments also include, for example, a computer-implemented method for authenticating a user. The method may include receiving, by one or more processors, a first set of authentication data associated with the user, the authentication data comprising an authentication code corresponding to an authentication transaction with a first authentication partner system. The method may also include generating, by the one or more processors, a second set of authentication data consistent with the validation request. The method may also include providing, by the one or more processors, the first set of authentication data and the second set of authentication data to a secure authentication network, the secure authentication network configured to route information to one or more authentication partner systems, at least one of the authentication partner systems storing validation data corresponding to a prior authentication event associated with the user.

The disclosed embodiments also include, for example, a method for validating an authentication transaction. The method may include receiving, by one or more processors, authentication data from an authentication network, the authentication data including an authentication code identifying an authentication transaction associated with an authenticating partner system. The method may also include validating, by the one or more processors, the authentication data, the validating comprising comparing the authentication data with validation data, the validation data corresponding to a prior authentication event associated with the user. The method may also include generating, by the one or more processors, validation information based on the validating, the validation information comprising a determination whether to validate the user for the authentication transaction. The method may also include providing, by the one or more processors, the validation information to the authentication network.

The disclosed embodiments also include, for example, a method for authenticating a user. The method may include receiving, by one or more processors, a request to authenticate an authentication transaction. The method may also include generating, by the one or more processors, a first authentication code identifying the authentication request. The method may also include providing, by the one or more processors, the first authentication code to a client device. The method may also include receiving, by the one or more processors, validation information from an authentication network, the validation information comprising a determination whether to validate the user for the authentication transaction, the validation information generated by a validating partner system based in part on the first authentication code. The method may also include determining, by the one or more processors, whether to approve the authentication transaction based on the validation information. The method may also include processing, by the one or more processors, the authentication transaction if the authentication transaction is approved.

The disclosed embodiments also include, for example, a method for authenticating a user. The method may include receiving, by one or more processors, authentication data associated with the user, the authentication data comprising an authentication code corresponding to an authentication transaction with a first authentication partner system. The method may also include providing, by the one or more processors, the authentication data to a second authentication partner system. The method may also include receiving, by the one or more processors, validation information from the second authentication partner system, the validation information comprising a determination whether to validate the user for the authentication transaction. The method may also include providing, by the one or more processors, the validation information to the first authentication partner system.

Additional objects and advantages of the disclosed embodiments will be set forth in part in the description that follows, and in part will be obvious from the description, or may be learned by practice of the invention. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

Figure 1:
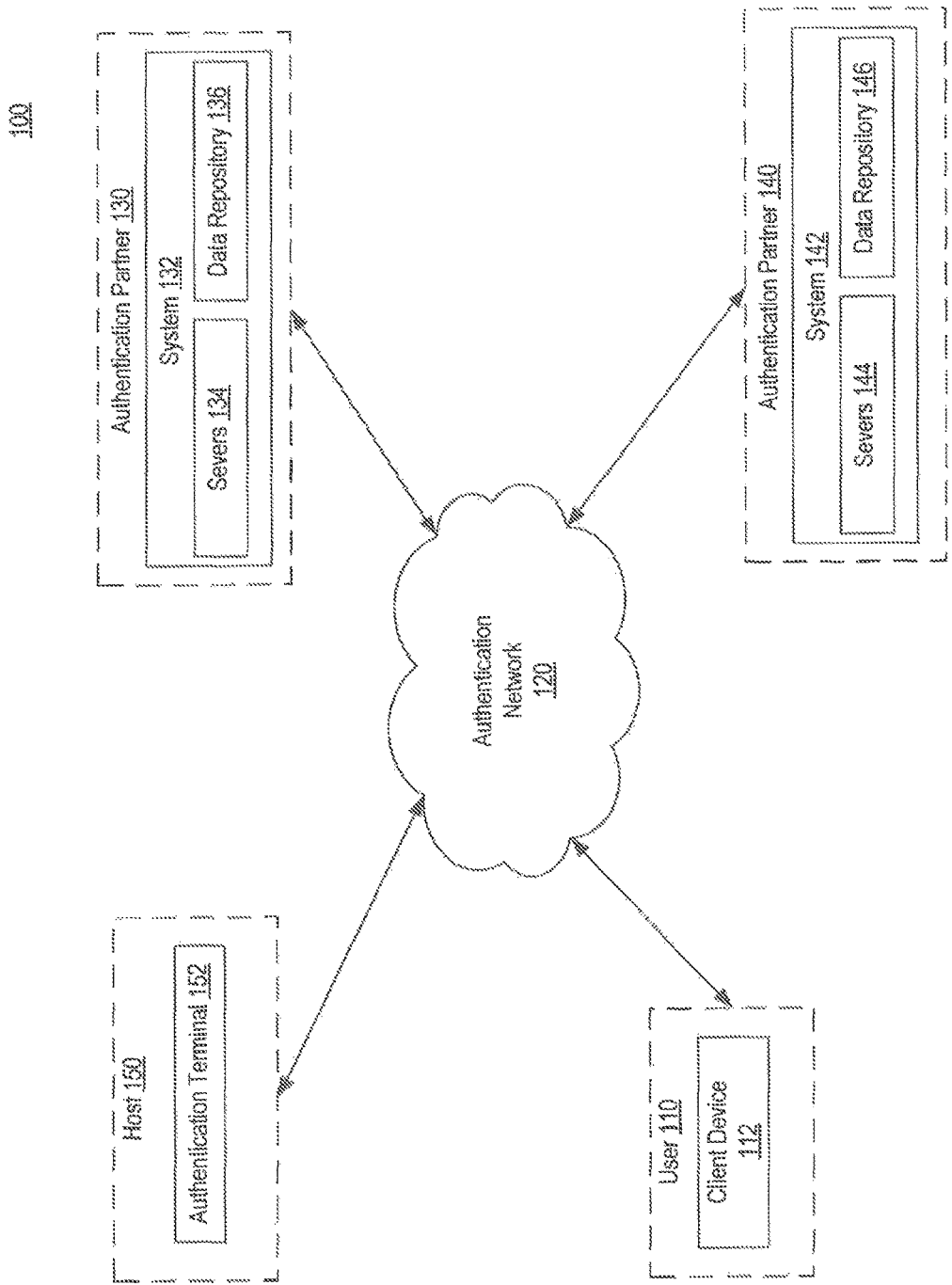
FIG. 1 depicts an exemplary computing environment consistent with disclosed embodiments.

FIG. 1 depicts an exemplary computing environment 100 consistent with disclosed embodiments. In one aspect, computing environment 100 may include one or more client devices (e.g., client device 112) which may be associated with respective one or more users (e.g., user 110), one or more authentication partner systems (e.g., systems 132 and 142) which may be associated with respective one or more authentication partners (e.g., authentication partners 130 and 140), one or more authentication terminals (e.g., authentication terminal 152) which may be associated with one or more hosts (e.g., host 150), and one or more secure authentication networks (e.g., authentication network 120) connecting one or more of the components of environment 100.

In some aspects, client device 112 may include any computing or data processing device consistent with the disclosed embodiments. For example, client device 112 may include a personal computer, a laptop computer, a tablet computer, a notebook computer, a hand-held computer, a personal digital assistant, a portable navigation device, a mobile phone, a wearable device, an embedded device, a smartphone, and any additional or alternate computing device. In certain aspects, client device 112 may be operable to transmit and receive data across a communications network (e.g., authentication network 120) or authentication terminal 152. Client device 112 may be implemented with one or more processors or computer-based systems, such as the computing system 200 of FIG. 2. In certain aspects, client device 112 may include one or more client devices.

In some embodiments, client device 112 may be associated with one or more users 110. In one example, user 110 may use client device 112 to perform one or more processes consistent with the disclosed embodiments. For example, user 110 may use client device 112 to input information and receive and transmit information to and from other systems in environment 100 such as authentication terminal 152, an authentication partner system (e.g., system 132), or another computing system.

In some embodiments, environment 100 may include one or more authentication partner systems (e.g., systems 132 and 142) configured to process, store, receive, obtain, and transmit information. In certain aspects, an authentication partner system may be configured to execute software instructions to perform one or more processes consistent with the disclosed embodiments. In one aspect, an authentication partner system may be associated with one or more authentication partners (e.g., authentication partner 130). In some embodiments, an authentication partner may be any entity storing, using, managing, or processing information related to authenticating a user. For example, in some aspects, an authentication partner may be a financial institution, a governmental entity (e.g., a DMV, a federal government agency, state or local body, a court, regulatory bodies, law enforcement, etc.), a business entity (e.g., a merchant), an educational entity (e.g., a university, local school, school board, etc.), other users (e.g., users authorized or capable of validating identities), and the like. In some aspects, a financial institution may include a commercial bank, an investment bank, a provider of financial service accounts (e.g., checking, savings, credit, debit, reward, loyalty accounts, etc.), or a provider of payment instruments (e.g., a credit card, a debit card, a prepaid card, check instruments, etc.).

In certain aspects, an authentication partner system (e.g., system 132) may include computing systems that process, among other things, authentication transactions. An authentication transaction may include any transaction, exchange, or process in which a user's identity, personal information, or other characteristics are required for approval. In some embodiments, the nature of the authentication transaction processed by an authentication partner system may depend in part on a type or character of an authentication partner associated with the system (e.g., partner 130), the user, or any other parameter consistent with the disclosed embodiments. For example, authentication transactions associated with a system of a financial institution may include opening or closing financial service accounts, modifying financial service account information, registering for or renewing payment instruments, applying for credit, purchasing goods or services, transferring funds, paying bills, purchasing or selling securities, repaying loans, or the like.

In other embodiments, authentication transactions may include transactions related to governmental entities, educational entities, business entities, and other entities that require authenticating a user to conduct a transaction. For example, authentication transactions associated with government entities may include applying for, renewing, or modifying government licenses and permits (e.g., drivers' licenses, passports, hunting and game licenses, alcohol and beverage licenses, parking permits, voting cards, etc.); updating governmental records (e.g., changing a vehicle's garage jurisdiction with the DMV, updating an address for a passport, changing a last name with a Social Security office, etc.); conducting government-related transactions (e.g., establishing a forwarding address, paying court fees, filing or paying taxes, etc.); and the like. In another example, authentication transactions may include educational transactions such as applying for admission, registering for classes, paying tuition, managing meal plans, submitting exams, and so on. Other types of authentication transactions will be apparent upon consideration and practice of the disclosed embodiments, and the above listing of certain authentication transactions is for illustrative purposes only.

In certain aspects, an authentication partner system (e.g., systems 132 or 142) may include one or more servers (e.g., servers 134), and one or more data storages (e.g., data repository 136). In some embodiments, server 134 may include software programs and one or more processors for executing the programs. Server 134 may be configured to execute software instructions to perform one or more processes consistent with the disclosed embodiments. In one embodiment, for example, user device 112, authentication terminal 152, and/or another authentication partner system (e.g., system 142) may exchange information facilitating execution of the one or more processes consistent with the disclosed embodiments. The software instructions of server 134 may be incorporated into a single computer, a single server, or any additional or alternative computing device apparent to one of ordinary skill in the art. Server 134 may also include distributed computing devices and computing systems, and may execute software instructions on separate computing systems and servers.

An authentication partner system (e.g., system 132) may include one or more data repositories 136 configured to store information consistent with the disclosed embodiments. In some aspects, data repository 136 may store information including user data. In certain embodiments, user data may reflect information uniquely identifying one or more users (e.g., user 110) of an authentication partner (e.g., partner 130) associated with the system. For example, a customer of a financial institution (e.g., partner 130) may access a web page associated with the authentication partner system (e.g., through a web server executed on the system), and subsequently register for banking services, provide data, receive information, make payments, and so on.

In some embodiments, user data may include personal information associated with a user 110 (e.g., a name, home address, or date of birth), demographic information (e.g., educational level, income level), government-issued identifiers (e.g., driver's license numbers, passport numbers, Social Security numbers, etc.), employment information (e.g., employer name or address), and/or contact information (e.g., e-mail addresses, home numbers, work numbers, or mobile numbers). In certain embodiments, user data may also include public or private records information such as a user's driving record, credit score, passport information (e.g., issuance date, expiration date, etc.), driver's license information (e.g., expiration date, organ donor status, etc.), school grades, arrest record, judgment and lien information, court filings, medical records, and the like. In some aspects, user data may also include several instances of a particular kind of data (e.g., multiple residences, historical credit scores, multiple phone numbers, etc.).

In some aspects, user data may also include one or more credentials associated with registered users of the authentication partner. For example, the credentials may include, but are not limited to, a user name, a user-specified password, a system-generated password, or an alphanumeric identification number (e.g., a PIN) specified by the user or assigned by the authentication partner system. In certain aspects, user data may include information facilitating enhanced credential techniques. For example, user data may store information identifying a security question associated with a customer (e.g., "What is your mother's maiden name?") and the customer's registered answer to the security question. User data may also include information identifying a particular security image or avatar selected by the user and displayed by the user during the credential process.

In some embodiments, user data may include client device identification information identifying one or more client devices 112 registered to user 110. In certain aspects, device information may include a telephone number, IP address, MAC address, serial number, operating system information, software version, browser information, and the like. In one embodiment, the user may provide the client device information (e.g., a mobile telephone number provided by the user). In other embodiments, other computing systems may be configured to execute processes that automatically collect client device information (e.g., collecting an IP address associated with the client device). For example, authentication partner system 132 or authentication terminal 152 may be configured to collect device information associated with a client device.

In certain embodiments, user data may also include information identifying, relating to, or associating with one or more authentication transactions or accounts maintained, managed, stored, hosted, or processed by authentication partner system 132 (or authentication partner 130). In some embodiments, the nature and extent of the user data stored may depend on the type of account or authentication transaction managed by the authentication partner system or authentication partner.

For example, in one embodiment, an authentication partner system (e.g., system 142, system 132, etc.) may store user data associated with a user of a financial institution. In some aspects, the user data may include financial service account information such as a checking account, a savings account, a credit line, an account linked to a credit or debit card, a brokerage account, and any other provided or supported by the financial institution. In certain aspects, user data may also include information identifying investments held by one or more customers of the financial institution (e.g., positions in one or more securities held by the customers). Information within user data may also identify, for a single customer, one or more accounts associated with the user and data corresponding to the accounts (e.g., account, expiration date information, card number information, card security codes, PINs, account balance information, credit limit information, account activity, etc.). In other aspects, user data may include other kinds of account information such as membership accounts for services or activities (e.g., a gym membership, prescription drug information, a library card, employment identification, student records information, government records information, etc.). Other types of user data may be stored and used by the disclosed embodiments.

In some embodiments, environment 100 may also include one or more authentication terminals 152. An authentication terminal may include a computing system configured to exchange information over a network (e.g., an authentication network 120) consistent with the disclosed embodiments. For example, in one aspect, authentication terminal 152 may exchange information with client device 112 and authentication partner systems 132 and 142 over authentication network 120 to facilitate the processing of authentication transactions. In certain aspects, authentication terminal 152 may include one or more servers or data repositories, and may include distributed computing systems for handling processes consistent with the disclosed embodiments. In some aspects, authentication terminal 152 may constitute a separate computing system in communication with client device 112 and/or authentication network 120. For example, authentication terminal 152 may include a kiosk disposed at a physical location, an existing terminal (e.g., a register at a merchant store, an ATM, etc.), or the like. In other embodiments, authentication terminal 152 may include client device 112, and any process disclosed herein with respect to an authentication terminal may take place on client device 112 (and vice versa).

In some aspects, authentication terminal 152 may be configured to receive, obtain, process, and transmit information over communications networks or pathways separate from authentication network 120. For example, in one embodiment, authentication terminal may be configured to exchange information with other devices (e.g., client device 112, another authentication terminal 152, etc.) over a secondary communications network such as a LAN, WAN (e.g., the Internet), WiFi, near-field communication (NFC) field, Bluetooth™ connection, cellular network, wired/wireless connection, etc. In some embodiments, authentication terminal 152 may include or interface with auxiliary devices facilitating the obtaining, transmitting, processing, routing, and storing of information. For example, authentication terminal 152 may include a visual code scanners (e.g., for reading linear or matrix codes), card readers (e.g., for reading debit cards, credit cards, student ID cards, etc.), image scanners (e.g., for scanning images of checks, processing MICR data, etc.), NFC receivers (e.g., to receive mobile wallet payments), Bluetooth devices, biometric scanners, and the like. In another example, authentication terminal 152 may be configured to process information (e.g., information received from client device 112), determine the proper destination system based on the processing, and route the information to the proper destination.

In certain aspects, authentication terminal 152 may be associated with a host 150. Host 150 may be any kind of entity capable of housing authentication terminal 152 or managing information processed therefrom. For example, in some embodiments, host 150 may include entities such as a merchant, a business, a place of work, a government agency, an educational institution, a financial institution, a library, a transportation hub (e.g., an airport, train station, bus stop, parking garage, etc.), a gas station, a convenience store, an electronic commerce provider, and the like. In some embodiments, authentication terminal 152 may represent a point-of-sale (POS) module associated with host 150. Authentication terminal 152 may be configured to perform known POS processes, and may be disposed at a physical location associated with host 150 (e.g., as a kiosk, computer, incorporated into another computing device such as a register, etc.). For example, authentication terminal 152 may be implemented with processors or other computer systems configured to execute software instructions to transmit and receive data across a communications network (e.g., authentication network 120) and process POS transactions. In other aspects, authentication terminal 152 may not be associated with a particular host. For example, in one embodiment, an authentication terminal may include a user's personal client device 112, a standalone terminal, and so on.

In some embodiments, environment 100 may also include authentication network 120. In some aspects, authentication network 120 may represent any type of communication network or medium of digital communication for transmitting information between computing devices. For example, authentication network 120 may include a LAN, a wireless LAN, a cellular network, an RF network, a NFC network (e.g., a WiFi network), a wireless Metropolitan Area Network (MAN) connecting multiple wireless LANs, NFC communication link(s), any physical wired connection (e.g., via an I/O port), and a WAN (e.g., the Internet). In some embodiments, authentication network 120 may be secured through physical encryption (e.g., line encryption), by requiring information to be encrypted on other computer systems (e.g., end encryption), and the like.

In certain aspects, authentication network 120 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. In some aspects, authentication network 120 may also include one or more mobile device networks, such as a GSM network or a PCS network, allowing devices (e.g., authentication terminal 152 or client device 112) to send and receive data via applicable communications protocols, including those described herein.

In some aspects, authentication network 120 may be include or be associated with one or more computer systems and related components (e.g., servers, data repositories, processors, software instructions, databases, etc.) consistent with the disclosed embodiments. In one embodiment, for example, authentication network 120 may be associated with, operated by, or managed by an authentication partner system (e.g., system 132). In other embodiments, authentication network 120 may be implemented with a computer-based system (e.g., the computer system 200 of FIG. 2).

In some embodiments, authentication network 120 may also include interfaces for providing communication among components of environment 100. For example, authentication network 120 may be configured with components and software that, when executed, receive information from computing devices (e.g., an authentication terminal 152, a client device 112, an authentication partner system 132, etc.). In some aspects, authentication network 120 may be configured to process the received information and provide the processed information to other computing systems (e.g., authentication partner 132). In one example, authentication terminal 152 may receive information from client device 112, process the information, and transmit the information to authentication network 120 for further processing and routing. In another example, authentication network 120 may be configured to receive information from other systems (e.g., authentication partner system 132), process the information, and route the information to other computing systems such as a second authentication partner system (e.g., system 142), authentication terminal 152, client device 112, and the like.

Authentication network 120 may be configured to process information, determine where to route the information based on the processing, and provide the Information to other computer systems (e.g., authentication partner system 132 or 142, authentication terminal 152, etc.). In some aspects, authentication network 120 may be configured to perform authentication check processes that determine whether the information involves an authentication transaction or other transaction (e.g., a sale of goods or services, account balance check, etc.), and process and/or route the information accordingly. In one aspect, authentication network 120 may perform certain processes, route the information to proper destination systems (e.g., particular systems of an authentication partner 130), and provide other functionalities consistent with the disclosed embodiments upon recognizing information associated with an authentication transaction. For example, authentication network 120 may be configured to determine whether information received from a computer system (e.g., authentication terminal 152) associated with an authentication transaction has been processed, validated, authenticated, confirmed, etc., and if not, conduct further processing and provide the information to different systems based on the determination.

In certain aspects, authentication network 120 may comprise, include, or implement existing communication and routing networks. For example, in one aspect, authentication network 120 may include a payment network comprising one or more computer systems associated with a payment technology such as a financial account payment service provider (e.g., credit card payment networks such as VISA™, Mastercard™, etc.). In certain aspects, the payment network may include or implement any of the computing systems, processes, or functionalities consistent with the authentication network 120. For example, the payment network may include one or more processors, servers, data storages, etc., and may be configured to process received information and route the information to appropriate systems. The payment network may be configured to process received information in accordance with known payment network processes and route the information to other systems for additional processing.

In some aspects, authentication network 120, authentication terminal 152, and/or an authentication partner system (e.g., system 132) may include a computer (e.g., a personal computer, network computer, server, mainframe computer, etc.) having one or more processors selectively activated or reconfigured by a computer program. Such a computer may be configured as a particular computing system based on execution of software instructions that perform one or more processes consistent with the disclosed embodiments. In certain aspects, authentication network 120, authentication terminal 152, and/or an authentication partner system may be incorporated as corresponding nodes in a distributed network, and/or as corresponding networked servers in a cloud-computing environment. In one embodiment, authentication network 120, authentication terminal 152, and/or an authentication partner system may communicate with one or more additional servers that facilitate the distribution of processes for parallel execution by the additional servers.

While FIG. 1 depicts environment 100 with a certain number of client devices 112, authentication terminals 152, and authentication partner systems 132 and 142, environment 100 may contain any number of such computing systems consistent with the disclosed embodiments. For example, environment 100 may include a plurality of client devices 112, each associated with a plurality of users 110. Similarly, environment 100 may include a plurality of authentication terminals 152, each associating with one or more hosts 150. In certain aspects, environment 100 may include three or more authentication partner systems, which each may associate with one or more authentication partners.

Environment 100 may also include additional authentication networks, communication networks, and other networks not shown in FIG. 1.

Figure 2:
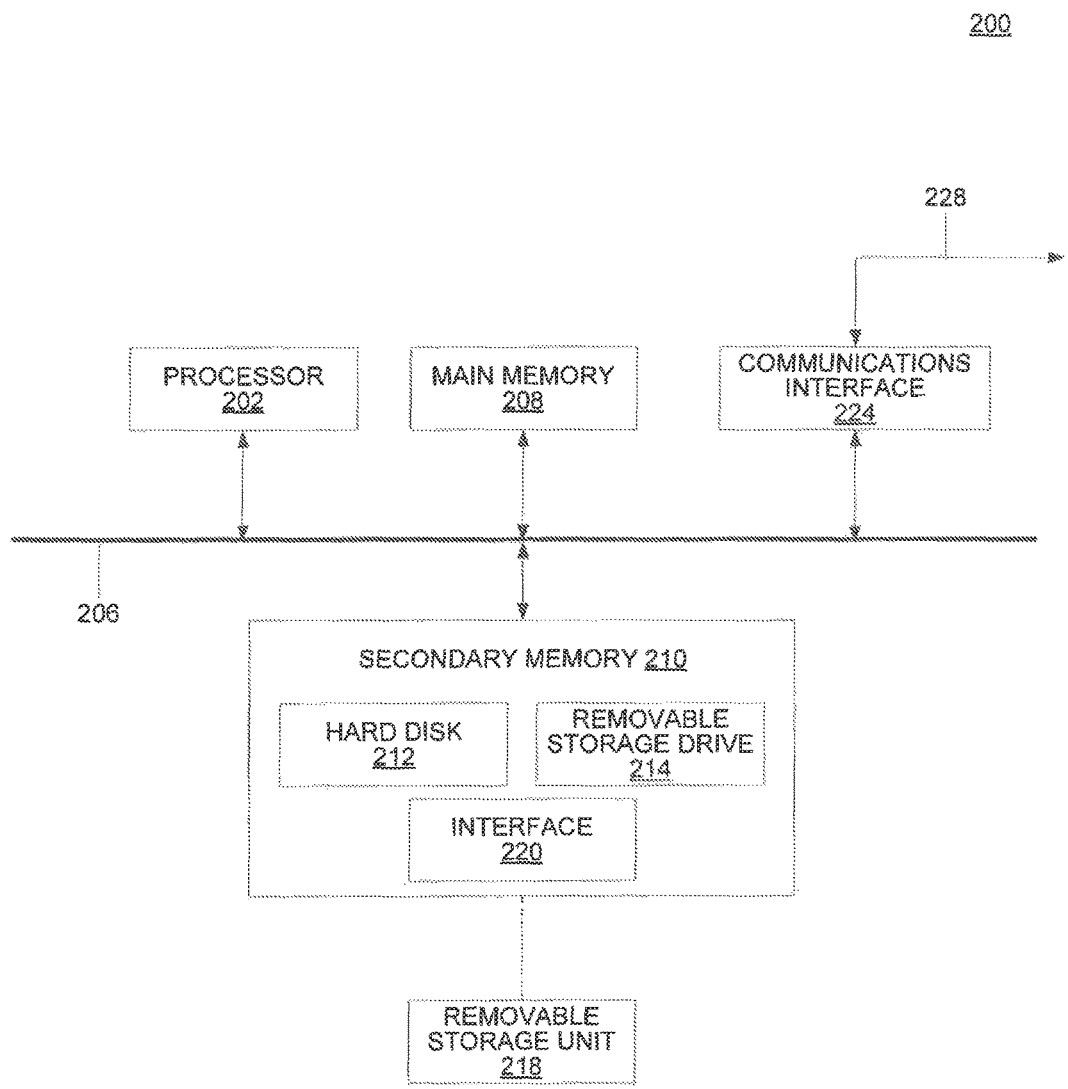
FIG. 2 depicts an exemplary computing system consistent with the disclosed embodiments.

FIG. 2 depicts a block diagram of exemplary computer system 200 with which certain aspects consistent with the disclosed embodiments may be implemented. For example, in some aspects, computer system 200 may reflect computer systems associated with client device 112, authentication terminal 152, authentication partner system 132 or 142, authentication network 120, and the like. In some embodiments, computer system 200 may include one or more processors 202 connected to a communications backbone 206 such as a bus or external communications network (e.g., any medium of digital data communication such as a LAN, MAN, WAN, cellular network, WiFi network, NFC link, Bluetooth, GSM network, PCS network, authentication network 120, and any associated protocols such as HTTP, TCP/IP, RFID, etc.).

In certain aspects, computer system 200 may include main memory 208. Main memory 208 may comprise random access memory (RAM) representing a tangible and non-transitory computer-readable medium storing computer programs, sets of instructions, code, or data executed with processor 202. When executed by processor 202, such instructions, computer programs, etc., enable processor 202 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HDD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of Instructions, code, or data to be executed by processor 202.

In other embodiments, secondary memory 210 may include other means for allowing computer programs or other program instructions to be loaded into d computer system 200. Such means may include, for example, another removable storage unit 218 or an interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to computer system 200.

Computer system 200 may also include one or more communications interfaces 224. Communications interface 224 may allow software and data to be transferred between computer system 200 and external systems (e.g., in addition to backbone 206). Communications interface 224 may include a modem, a network interface (e.g., an Ethernet card), a communications port, a PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics, RF link, and/or other communications channels. In one embodiment, the signals comprise data packets sent to processor 202. Information representing processed packets may also be sent in the form of signals from processor 202 through communications path 228.

In certain aspects, the computer-implemented methods described herein can be implemented on a single processor of a computer system, such as processor 202 of computer system 200. In other embodiments, these computer-implemented methods may be implemented using one or more processors within a single computer system and/or on one or more processors within separate computer systems in communication over a network.

In certain embodiments in connection with FIG. 2, the terms "storage device" and "storage medium" may refer to particular devices including, but not limited to, main memory 208, secondary memory 210, a hard disk installed in hard disk drive 212, and removable storage unit 218. Further, the term "computer-readable medium" may refer to devices including, but not limited to, a hard disk installed in hard disk drive 212, any combination of main memory 208 and secondary memory 210, and removable storage unit 218, which may respectively provide computer programs and/or sets of instructions to processor 202 of computer system 200. Such computer programs and sets of instructions can be stored within one or more computer-readable media. In certain aspects, computer programs and sets of instructions may also be received via communications interface 224 and stored on the one or more computer-readable media.

The disclosed embodiments include systems, methods, and computer-readable mediums storing instructions that, when executed by a processor(s), perform operations for authenticating users. In some embodiments, authenticating a user may comprise any process relating to an authentication transaction. In one aspect, the disclosed embodiments include systems, methods, and apparatuses for authenticating transactions based on prior, trusted authentications without requiring the user to provide information typically associated with such authentication transactions. In one embodiment, the systems, methods, and apparatuses consistent with the disclosed embodiments provide trusted networks of user authentications to validate any kind of authentication transaction.

Figure 3:
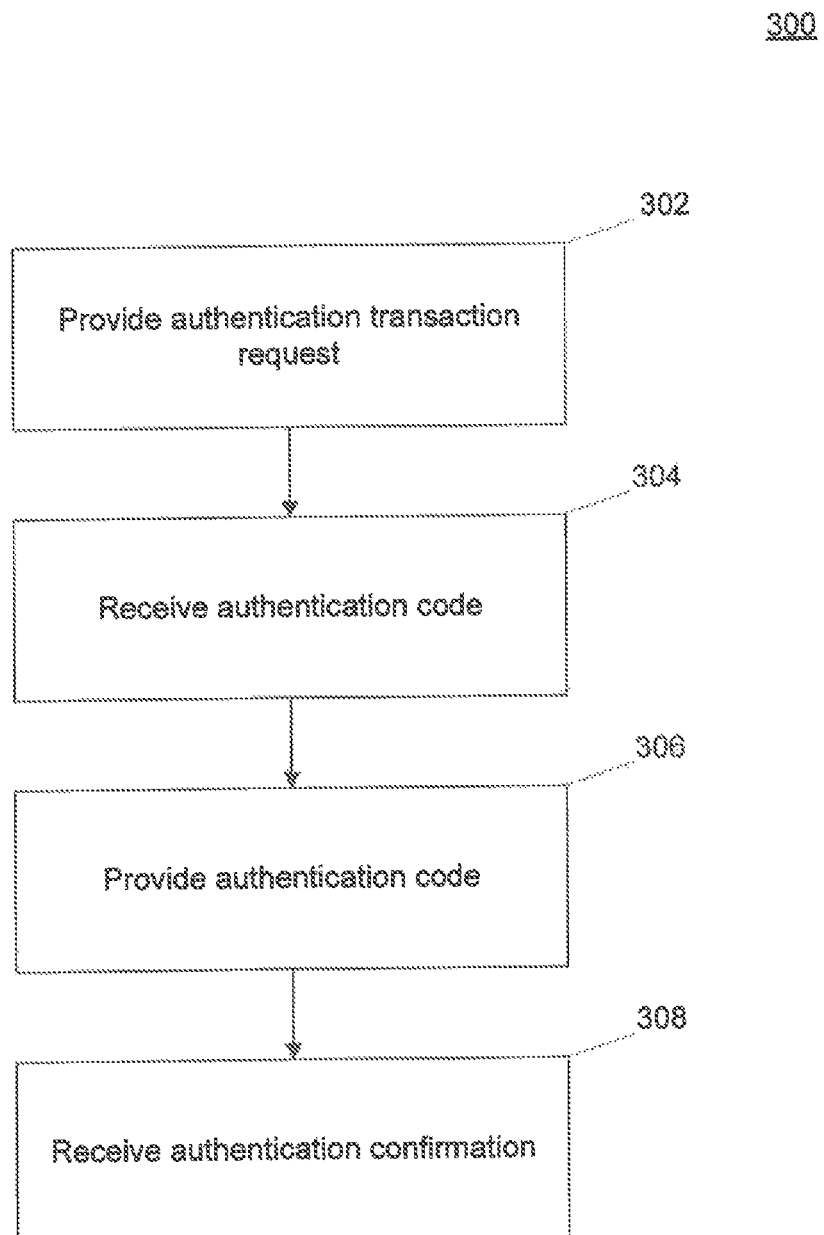
FIG. 3 depicts a flowchart of an exemplary authentication transaction request and confirmation process consistent with the disclosed embodiments.

FIG. 3 depicts a flowchart of an exemplary authentication transaction request and confirmation process 300 consistent with the disclosed embodiments. In certain aspects, a user may initiate processes associated with conducting an authentication transaction by providing input via client device 112. For example, a user may, through client device 112, provide an authentication transaction request to a computer system configured to process authentication transactions, such as an authentication partner system 132 or 142 (step 302). In certain embodiments, an authentication transaction request may reflect a request to authenticate a user for a particular authentication transaction.

For example, a user may provide an authentication transaction request to an authentication partner system (e.g., system 132) associated with a financial institution for authorization to open a new bank account, apply for credit, or any other kind of authentication transaction supported by the authentication partner system. In another example, a user may submit an authentication transaction request to an authentication partner system associated with a governmental entity to renew a driver's license, apply for a vehicle registration or hunting license, set up a forwarding address, and other such authentication transactions. In certain aspects, the authentication transaction request may correspond to any kind of authentication transaction consistent with the disclosed embodiments. As described in connection with certain embodiments, an authentication partner system receiving an authentication transaction request may be, for exemplary purposes only, referred to as an authenticating partner system.

In some aspects, the authentication transaction request may accompany, include, or require other information necessary to conduct or process the authentication transaction. In certain embodiments, this information may comprise any type of user data (e.g., user name, credentials, passwords, addresses, government identifiers, device information, etc.) consistent with the authentication transaction. For example, if a user submits an authentication transaction request associated with opening a checking account, an authenticating partner system associated with the host bank may require the user to register user data such as the user's name, address, login credentials for online services (e.g., user name, password, security question, etc.), social security number, and/or other user information to complete the registration process. In some embodiments, the authentication transaction request may include other information related to the request, such as the time, date, and/or place of the request.

In certain aspects, the extent and nature of the user data required in the authentication transaction request may depend on the user (e.g., high-risk users may require more detailed data), the authenticating partner system (e.g., based on internal guidelines established by the authentication partner), the authentication transaction (e.g., applying for credit may require different data than registering for a passport), the client device used to provide the request (e.g., high-risk devices may require more detailed data), or any other factor consistent with the disclosed embodiments. In one aspect, user 110 may provide this information through client device 112 in order to initiate processing of the authentication transaction request associated with an authenticating partner system (e.g., system 132).

In some embodiments, client device 112 may be configured to receive an authentication code generated by an authenticating partner system (e.g., system 132) in response to the authentication transaction request (step 304). In certain aspects, the authentication code may identify an authentication transaction request and any information included therein. The authentication code may comprise an encoded message, picture, representation, or take any other form consistent with the disclosed embodiments. For example, the authentication code may comprise any alphanumeric, symbolic, graphical, pictorial, visual, biometric, and/or audial expression for identifying the authentication transaction request. In one example, the authentication code may comprise a visual code (e.g., a linear or matrix visual code such as a QR code) encoding information corresponding to the authentication transaction request and other information. In another example, the authentication code may comprise an alphanumeric passcode configured for input into another computing device (e.g., authentication terminal 152).

In certain aspects, client device 112 may be configured to receive the authentication code over any communications network consistent with the disclosed embodiments. For example, client device 112 may receive an authentication code from an authenticating partner system via the internet, a cellular network, an NFC field, Bluetooth, a wired connection, and the like. In certain aspects, an authentication code may be configured to initiate processes consistent with the disclosed embodiments. For example, an authentication code may be configured to initiate certain processes when provided to an authentication network 120.

In some embodiments, client device 112 may receive additional information not encoded in the authentication code. In certain aspects, client device 112 may receive messages (e.g., e-mails, text messages, automated voice messages, pop notifications on a mobile device or web application, etc.) explaining the import of the authentication code. In some aspects, the message may also provide instructions explaining how to use the authentication code. For example, the message may include a list of one or more vendors, locations, terminals, kiosks, or other places authorized and/or capable of reading, scanning, accepting, receiving, or otherwise processing the authentication code.

In some aspects, client device 112 may be configured to provide an authentication code over a network (e.g., authentication network 120) or to a computing system in communication with the network, such as authentication terminal 152 (step 306). In some embodiments, a user may provide the authentication code to the authentication network (e.g., via client device 112) to facilitate approval of an authentication transaction. In certain aspects, client device 112 may also be configured to provide other information to the authentication network (e.g., directly, via authentication terminal 152, etc.) along with the authentication code. In some aspects, the authentication code and accompanying information (if any) may constitute authentication data. In certain aspects, authentication data may comprise an authentication code and any user data consistent with the disclosed embodiments. For example, information transmitted with an authentication code may include device information, a user's personal information, credential information, information related to the underlying authentication transaction, information related to other accounts or services associated with a user, any other kind of user data, and the like.

In certain embodiments, authentication data may also include information describing the time, place, and/or manner of the data provided from client device 112 to the authentication network 120, or from client device 112 to an authentication terminal 152. For example, authentication data may include the time of data exchange with an authentication terminal 152, the location of the data exchange, other information related to the authentication terminal (e.g., a serial number, manufacturer), information relating to a host associated with the terminal (e.g., the host's name, the type of host entity, the host's authentication transaction history, etc.), and the like. Authentication data may comprise any other kind of information consistent with the disclosed embodiments. In some aspects, the nature and extent of authentication data required or transmitted may depend on the underlying authentication transaction, the client device, the authentication terminal, the authentication partner systems associated with the authentication transaction, the user, and other factors.

In some embodiments, one or more authentication partner systems (e.g., systems 132 and 142) may be configured to validate and authenticate an authentication transaction over authentication network 120 based on the authentication data provided to the network. In one aspect, client device 112 may be configured to receive an authentication confirmation reflecting a determination whether the authentication transaction has been validated and/or approved by the networked computing systems (step 308). For example, client device 112 may be configured to receive an authentication confirmation indicating that a new bank account has been opened for a user, the user's passport has been renewed, an application for credit has been approved, and so on.

The authentication confirmation may take any form capable of informing the user that the transaction has been processed. For example, the authentication confirmation may include a written or pictorial message (e.g., e-mail, SMS text, pop notification in a mobile application, alert in a software program, etc.), a haptic response (e.g., a vibration), or audial message (e.g., recorded voice message, audible tone, etc.). Client device 112 may receive the authentication confirmation from another computer system (e.g., an authentication partner system, an authentication terminal 152, etc.), and may receive the authentication confirmation over any communications network. Client device 112 may be configured to receive other kinds of confirmation messages or data consistent with the disclosed embodiments.

Figure 4:
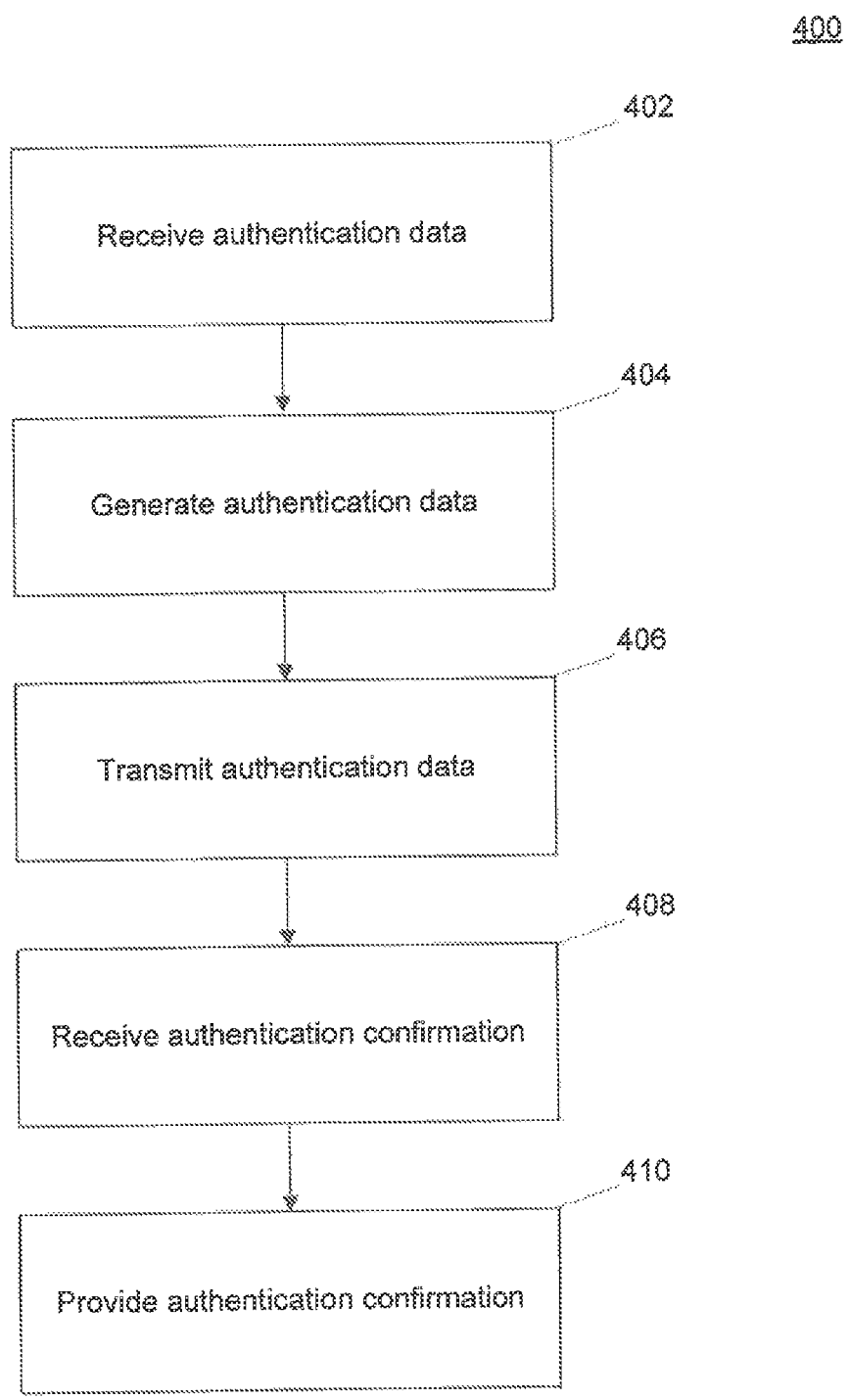
FIG. 4 depicts a flowchart of an exemplary authentication data transmission process consistent with the disclosed embodiments.

The disclosed embodiments include systems and methods for transmitting authentication data to an authentication network 120. For example, FIG. 4 depicts a flowchart of an exemplary authentication data transmission process 400 consistent with the disclosed embodiments. In some aspects, an authentication terminal 152 may be configured to receive authentication data and transmit the authentication data to an authentication network 120 to conduct processes consistent with the disclosed embodiments (step 402). In certain aspects, the received authentication data may include an authentication code (e.g., generated by an authenticating partner system), and/or other information associated with the transaction code (e.g., consistent with the embodiments disclosed in connection with FIGS. 3 and 6). In some aspects, an authentication terminal 152 may include a client device 112 configured to directly communicate with authentication network 120. In other aspects, authentication terminal 152 may include a separate computing device separate from client device 112. For example, in one embodiment, authentication terminal 152 may include a POS device disposed at a physical location associated with a host 150.

In some aspects, authentication terminal 152 may be configured to receive authentication data via direct input. In certain embodiments, direct input may include input delivered to a keyboard, keypad, interactive interface, touchscreen display, or other component configured to receive input representing the authentication data. For example, an operator of the authentication terminal 152 (e.g., user 110 or another entity) may provide input representing an alphanumeric authentication code to the authentication terminal via a keyboard. In some aspects, the operator of authentication terminal 152 may provide input to the input devices reflecting any kind of authentication data (e.g., any user data such as names, addresses, phone numbers, PINs, account numbers, etc.). For example, authentication terminal 152 may be configured to receive a PIN associated with a user's bank card via direct input into a keyboard, keypad, touchscreen, or similar input device.

In certain embodiments, authentication terminal 152 may receive authentication data from other computing systems (e.g., client device 112) over a communications network (e.g., WAN, LAN, cellular network, Bluetooth, etc.). For example, in one aspect, user 110 may provide input to client device 112 representing authentication data (e.g., an authentication code and/or associated information), and authentication terminal 152 may be configured to receive the input over the communications network. In some embodiments, authentication terminal 152 may include auxiliary devices such as visual code scanners, image scanners, NFC receivers, etc. configured to read, scan, interpret, and process information on client device 112. For example, authentication terminal 152 may include visual code scanner configured to scan matrix barcodes (e.g., a QR code) displayed on client device 112 representing an authentication code. In another example, authentication terminal 152 may include an NFC receiver or other wireless payment technologies to receive digital payment information (e.g., Google Wallet™, or other known electronic wallet technologies). Authentication terminal 152 may be configured to read and/or generate authentication data based on the information encoded in an authentication code or stored within client device 112.

In some embodiments, authentication terminal 152 may be configured to receive and generate authentication data from objects other than client devices. In some aspects, authentication terminal 152 may include or communicate with card readers, code scanners, image scanners, receivers, biometric scanners, or other devices capable of receiving, generating, and processing authentication data. For example, authentication terminal 152 may include a card reader configured to read transaction cards (e.g., credit cards, debit cards, student identification cards, driver's licenses, prepaid cards, passports, etc.) to obtain and/or generate authentication data therefrom (e.g., a card number, expiration date, bank identification number, routing number, security codes, student identification number, any other user data, etc.). In another example, authentication terminal 152 may include a visual code scanner (e.g., a two-dimensional imager) configured to scan visual codes on cards, papers, documents, products, and other objects to generate authentication data. In certain embodiments, authentication terminal 152 may include hardware or software instructions to assist with processing the information obtained and generated from objects such as cards, papers, client devices, etc. For example, authentication terminal 152 may be configured to perform optical character recognition (OCR) to recognize and interpret text and other information (e.g., MICR data) on papers, financial instruments (e.g., checks), licenses, and the like.

In some embodiments, authentication terminal 152 may be configured to generate additional authentication data consistent with the disclosed embodiments (step 404). In certain aspects, authentication terminal 152 may be configured to generate information reflecting the time, place, and/or manner of the data provided to the authentication terminal or authentication network 120. For example, in one embodiment, authentication terminal 152 may be configured to generate authentication data reflecting time information (e.g., the time at which the terminal received authentication data from client device 112), location information (e.g., the physical location of the terminal), terminal information (e.g., serial number, ID number), host identity information (e.g., the name and/or address of a host 150 associated with the terminal), host type information (e.g., the types of goods or services offered by the host 150 such as a gas station, library, government agency, financial institution, etc.), and the like. In some aspects, other computing devices in communication with authentication network 120 may use these types of authentication data to conduct processes consistent with the disclosed embodiments.

In certain aspects, authentication terminal 152 may be configured to transmit any portion of the obtained, generated, and/or processed authentication data to authentication network 120 (step 406). In some embodiments, the authentication terminal 152 may be configured to other transmit information to computing systems of environment 100. For example, in one embodiment, authentication terminal 152 may be configured to identify an authenticating partner system associated with an authentication transaction (e.g., via scanning an authentication code), and provide a notification to the authenticating partner system reflecting that the code has been scanned. In certain aspects, this communication may take place over authentication network 120 and/or a secondary communications network (e.g., the internet). In certain aspects, authentication terminal 152 may be configured to provide other information consistent with the disclosed embodiments. For example, in one aspect, authentication terminal 152 may be configured to receive information related to validating an authentication transaction (e.g., as discussed in connection with FIG. 5), and provide the information to another computer system connected to authentication network 120.

Consistent with aspects of the disclosed embodiments, additional computing components connected to the authentication network may be configured to validate and authenticate an authentication transaction reflected in the authentication data. In certain embodiments, authentication terminal 152 may be configured to receive an authentication confirmation representing that the authentication transaction has been approved (e.g., by the authenticating partner system) (step 408). The authentication confirmation may take any form consistent with the disclosed embodiments (e.g., an e-mail, SMS text, audial tone, vibration, etc.), and may be received via any suitable communications network (e.g., the internet, authentication network 120, etc.). In some aspects, authentication terminal 152 may be configured to provide the authentication confirmation to a client device 112 (e.g., the device storing the authentication code, another client device, etc.) (step 410). In other aspects, authentication terminal 152 may not receive an authentication confirmation, and/or may not provide the authentication confirmation to client device 112.

In certain embodiments, authentication terminal 152 may be configured to retrieve, obtain, receive, or collect other information from systems connected to authentication network 120. In some aspects, authentication terminal 152 may be configured to determine the identity of an authenticating partner system based on received authentication data, and obtain additional instructions, information, or data from the identified system. In some embodiments, the additional instructions may reflect types or instances of authentication data required to perform the authentication transaction. In one example, authentication terminal 152 may be configured to receive authentication data related to a request for renewing a concealed carry permit, and recognize, based on the received authentication data, that the request relates to a concealed carry transaction. In some embodiments, the authentication terminal 152 may be configured to determine the appropriate authenticating entity system associated with the transaction (e.g., a circuit court system), and determine the remaining authentication data required from the customer (e.g., the user's name, Social Security number, address, current permit number, date of birth, etc.). The terminal may receive this information via direct input, client device 112, or a computing system connected to authentication network 120 (e.g., another partner system), etc., and include the required information in authentication data provided to the authentication network 120.

Figure 5:
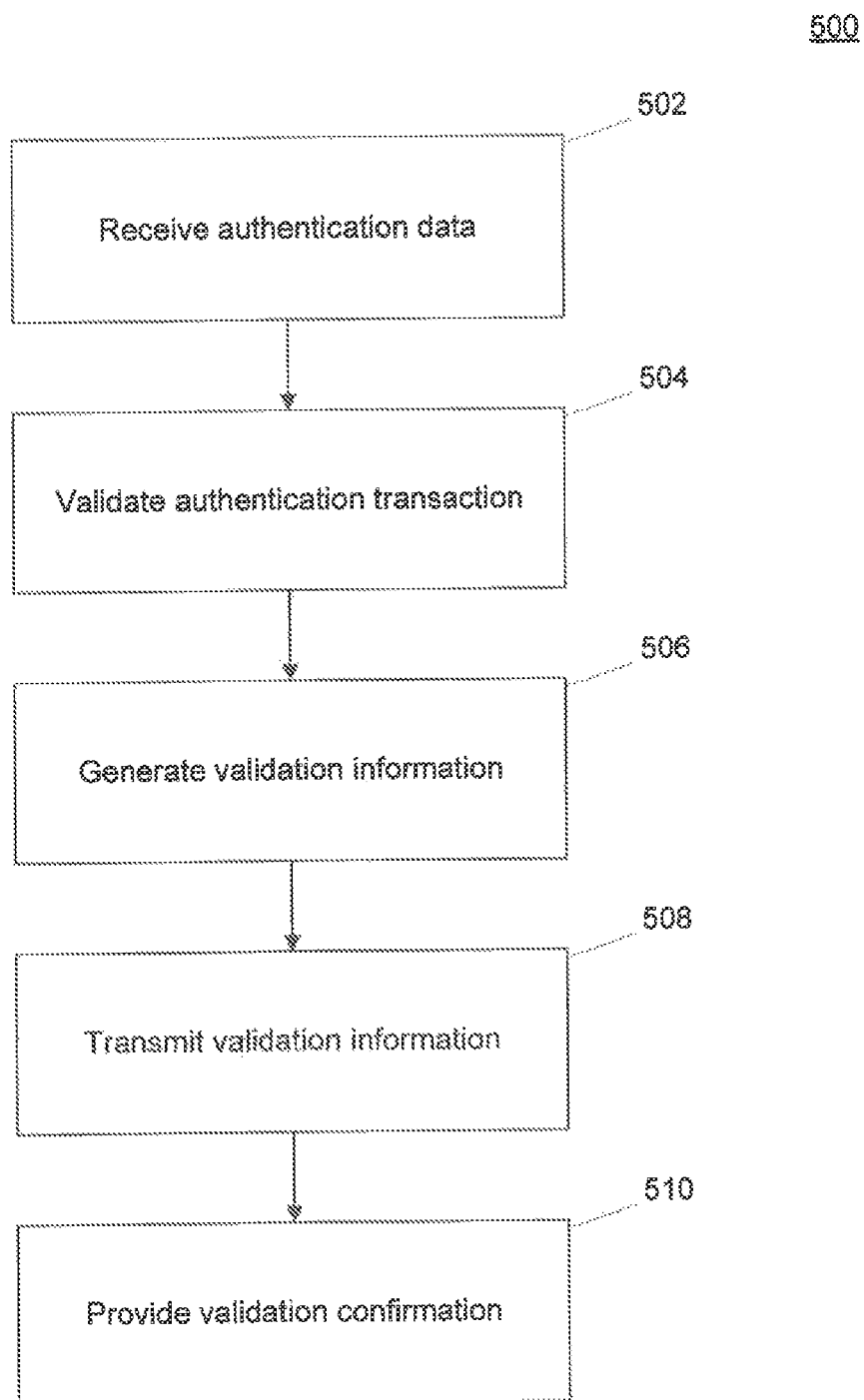
FIG. 5 depicts a flowchart of an exemplary validation process consistent with the disclosed embodiments.

Aspects of the disclosed embodiments include systems and methods for validating an authentication transaction. FIG. 5 depicts a flowchart of an exemplary validation process 500 consistent with the disclosed embodiments. In some aspects, an authentication partner system (e.g., system 142) may be configured to receive authentication data (e.g., an authentication code and accompanying information)

transmitted over authentication network 120 to conduct processes consistent with the disclosed embodiments (step 502). In certain aspects, an authentication partner system may be configured to perform processes consistent with validating an authentication transaction associated with the received authentication data (step 504). In some embodiments, validating an authentication transaction may reflect preliminary determination whether to authenticate a user for the transaction (e.g., whether to open a bank account, approve an application for credit, renew a license, etc.), whether the information included in the authentication data is accurate, and other determinations consistent with the disclosed embodiments.

As described in connection with certain embodiments, a computing system validating an authentication transaction may be, for exemplary purposes only, referred to as a validating partner system. In certain aspects, a validating partner system may be associated with an authentication partner representing a financial institution, government entity, business enterprise, educational entity, entity associated with authentication network 120, a user, or any other entity consistent with the disclosed embodiments.

In some embodiments, a validating partner system may be configured to receive, process, and/or interpret authentication data to determine the information required to validate an authentication transaction. In certain aspects, the information that may be used to validate an authentication transaction may be referred to as validation data. In some aspects, validation data may include information associated with a prior authentication event. In certain aspects, a prior authentication event may include any past authentication transaction processed by the validating partner system. For example, in one embodiment, a prior authentication event may include the opening of a bank account, issuance of a government license (e.g., driver's license, passport, etc.), application for credit, Issuance of a library card, gym membership registration, or any other authentication transaction consistent with the disclosed embodiments.

In certain aspects, the validating partner system may be configured to store information associated with a prior authentication event as user data. For example, the validating partner system may store information reflecting a user's personal information, credential information, financial account information (e.g., account numbers, PIN, routing number, bank identifiers, etc.), public or private records information, or any other type of user data consistent with an authentication transaction. In some embodiments, the user data may be received from client device 112, generated on the validating partner system, received or obtained from other computing systems, or any combination thereof.

In some embodiments, validation data may include other information (e.g., other user data) not related to a prior authentication event, and any aspect of user data stored within the validating partner system may constitute validation data. In some aspects, for instance, a validating partner system may be configured to receive, obtain, store, and/or generate one or more validation conditions as user data. In certain aspects, a validation condition may specify circumstances governing whether an authentication transaction should be validated (or not validated). In some embodiments, a validating partner system may be configured to validate an authentication transaction only when the one or more validation conditions are met. In one aspect, the validation conditions may include a time condition reflecting one or more time periods during which a process associated with the authentication transaction must occur. In some aspects, a process associated with the authentication transaction may include any transaction event such as a transaction terminal 152 receiving or transmitting authentication data, a validating partner system receiving authentication data, a validating partner system validating an authentication transaction (e.g., generating validation information), an authentication partner receiving or processing validation information, and the like. For example, a time condition may specify a time period during which an authenticating terminal 152 system must receive authentication data from a client device 112. If the validating partner system determines that the terminal did not receive authentication data during this time (e.g., based on its own processes or as included in the authentication data), then the system may not validate the authentication transaction.

In certain aspects, the validation conditions may include a location condition reflecting one or more geographical ranges in which a process associated with the authentication transaction must occur. For example, a location condition may specify a geographical extent in which an authentication terminal 152 must reside. In some aspects, the validating partner system may not validate the authentication transaction if it determines that the authentication network 120 received authentication data from a terminal outside the predefined range. In certain embodiments, the validation conditions may also include: an entity condition (e.g., reflecting one or more entities in which a process must occur), an entity type condition (e.g., reflecting one or more entity types in which a process must occur), a validator condition (e.g., reflecting one or more systems authorized to validate an authentication transaction), a frequency condition (e.g., reflecting a maximum number of times an entity may authenticate a transaction), a necessary data condition (e.g., reflecting information that must subsist in the authentication data and/or subsist in a particular format), and the like.

In some embodiments, the extent and type of validation conditions may depend on the authentication transaction, the authentication partner systems involved in the authentication transaction, and other factors. For example, an authentication transaction may require a user to swipe a transaction card having a magnetic stripe through a corresponding reader at an authentication terminal 152. Additionally or alternatively, the transaction card may represent an EMV card (e.g., a chip card or integrated-circuit (IC) card compliant with the Europay MasterCard Visa (EMV) standard), the authentication transaction may require the user to physically insert the EMV card into authentication terminal 152 or to bring the EMV card into proximity to authentication terminal 152 (e.g., to transfer information using radio-frequency (RF) communication protocols, near-field communication (NFC) protocols, etc.). In certain aspects, the validation conditions may include, but are not limited to, a card frequency condition reflecting a maximum number of times a particular transaction card may be used to provide authentication data for processing an authentication transaction.

The disclosed embodiments are, however, not limited to authentication processes and authentication transactions that require physical transaction cards (e.g., cards with magnetic stripes and/or EMV cards). For example, client device 112 may store mobile-wallet data associated with transaction accounts held by user 110 (e.g., credit card accounts, debit card accounts, etc.), and further, may execute one or more application programs that establish a mobile wallet including the transaction accounts on client device 112. In some aspects, to facilitate authentication transactions consistent with the disclosed embodiments, user 110 may dispose client device 112 in proximity to a corresponding receiver of authentication terminal 152 (e.g., an NFC reader). Client device 112 may, for example, establish wireless communications with the corresponding reader and may transmit information identifying at least one of the transaction accounts to authentication terminal 152 (e.g., using NFC protocols, Bluetooth™ communications protocols, etc.). In certain aspects, the validation conditions may include an additional card frequency condition that reflects a maximum number of times a particular transaction account may provide authentication data for processing the authentication transaction.

Other kinds of validation conditions will be apparent to those of ordinary skill in the art based on consideration and practice of the disclosed embodiments. In some aspects, validation conditions may be established by a user (e.g., provided to client device 112), generated by the validating partner system, or both. The validating partner system may be configured to allow a user to add, delete, or modify certain validation conditions (e.g., by providing interactive input fields to a client device 112).

In certain aspects, the validating partner system may be configured to compare the received authentication data with the validation data (e.g., based on a prior authentication event, validation conditions, etc.), and determine whether the authentication data is consistent with the validation data based on the comparison. In some aspects, the validating partner system may be configured to assess whether portions of the validation data match those of the authentication data (e.g., whether a stored PIN for a user matches a PIN the user entered at an authentication terminal 152). In some embodiments, the validating partner system may determine whether the validation data sufficiently addresses the information required to validate the transaction (e.g., whether the validation data or authentication data is missing or incomplete). In certain aspects, the validating partner system may also determine whether to validate the authentication transaction based on comparing the authentication data to the validation conditions to ensure that all the conditions have been satisfied (e.g., the authentication terminal from which the authentication data was received resides within the geographical boundary set in a location condition). In certain embodiments, the validating partner system may determine to validate an authentication transaction when the authentication data is consistent with the validation data.

In certain embodiments, a validating partner system may be configured to generate validation information based on the validation processes (step 506). In some aspects, validation information may include the determination whether to validate the user for an underlying authentication transaction. For example, in one embodiment, validation information may reflect that the validating partner system has validated a user for opening a new bank account, applying for a license, etc. In certain aspects, validation information may also include other information related to the validation determination, such as validation data (e.g., the time of the validation, etc.), information reflected in or derived from user data stored in the validating partner system, routing information (e.g., reflecting destination systems to which an authentication network should route the validation information, such as another validating partner system or an authenticating partner system), and the like. Any aspect of stored user data may be included in the validation information. For example, in an authentication transaction associated with renewing a passport, validation information may include the user's date of birth, address, passport number, account numbers, etc. Validation information may include any other type of information consistent with the disclosed embodiments.

In other aspects, a validating partner system may be configured to provide validation data to another system of environment 100 (e.g., authentication terminal 152, an authenticating partner system, etc.) without generating validation information. For example, a validating partner system may provide validation data to the relevant authenticating partner system so that the authenticating partner system can authenticate the authentication transaction without receiving a preliminary validation from the validating partner system. In another example, a validating partner system may provide validation data to an authentication terminal 152 so that another system (e.g., the terminal) may validate the authentication transaction.

In some aspects, certain processes associated with validating an authentication transaction may occur automatically (e.g., by processors running on a validating partner system server), manually (e.g., by users or operators providing input to the system), or both. For example, in one embodiment, a validating partner system may include a client device associated with a user operator different from the user associated with the authentication transaction request. In certain aspects, the client device (as a validating partner system) may receive the authentication data, conduct processing to render the data in a human-readable format, and provide the data to the user operator. In some embodiments, the user operator may provide input to the device reflecting a determination whether to validate the user associated with the authentication transaction request (e.g., the entity the user operator is validating) based on any process consistent with the disclosed embodiments. For example, a user operator may receive a notification representing that another user has requested authentication for a particular authentication transaction. In this example, the authentication data included in the request may include the requestor's name, address, and other personal information. The user operator of the client device (as validating partner system) may provide input to the device reflecting that the requestor's provided name, address, and other information is correct. Any number of validating users may exist in this manner, creating a network of user validators.

In some embodiments, a validating partner system may be configured to transmit generated validation information to an authentication network 120 (step 508).

In some aspects, other computing systems communicating with network 120 may be configured to receive the validation information (and other information) over the network to conduct additional processing. For example, other computing systems may receive validation data over the network to revalidate the authentication transaction, validate portions of the transaction not validated by the originating validating partner system, or authenticate (e.g., approve) the underlying authentication transaction consistent with the disclosed embodiments.

In certain aspects, a validating partner system may be configured to provide a validation confirmation to authentication network 120 (step 510). In certain embodiments, a validation confirmation may reflect that the validating partner system has validated (or not validated) an authentication transaction in whole or part. In some embodiments, authentication network 120 may be configured to transmit the validation confirmation to other computer systems (e.g., authentication terminal 152, client device 112, etc.) for use in processes consistent with the disclosed embodiments. Additionally or alternatively, the validating partner system may be configured to provide the validation confirmation to other computer systems directly (e.g., via a communications network). The validation confirmation may take any form consistent with the disclosed embodiments (e.g., an e-mail, text message, pop notification, voice message, haptic response, etc.). In other embodiments, the validating partner system may not transmit a validation confirmation to network 120.

In some aspects, a validating partner system may be configured to receive and process validation information in addition to, or in lieu of, authentication data. In certain embodiments, the validating partner system may conduct processes consistent with validating an authentication transaction using validation information as an additional or alternative input to authentication data. In one aspect, the validating partner system may receive validation information (e.g., generated by another validating partner system) and/or authentication data from authentication network 120, and validate the authentication transaction consistent with the disclosed embodiments. For example, validating partner system may receive prior validation information generated from another validating partner system, identify the required validation data to authenticate the authentication transaction, compare the prior validation information to the validation data, and generate a second set of validation information. In certain aspects, the second set of validation information may revalidate prior validation information (e.g., verify the prior validation is correct), validate portions of the authentication transaction not addressed in the prior validation (e.g., due to missing or incomplete data), or any other refinement consistent with the disclosed embodiments.

Figure 6:
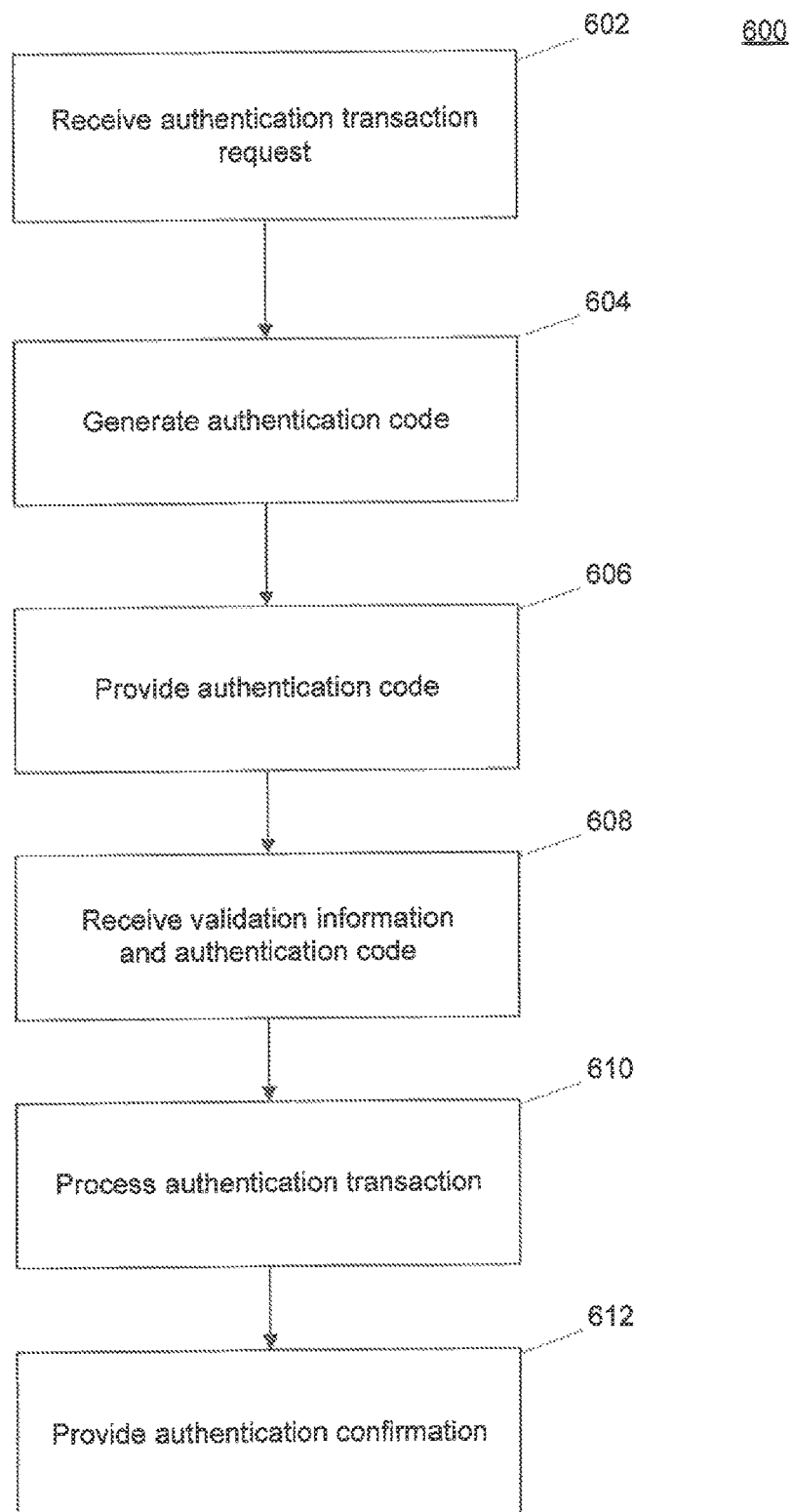
FIG. 6 depicts a flowchart of an exemplary authentication transaction receipt and confirmation process consistent with the disclosed embodiments.

FIG. 6 depicts a flowchart of an exemplary authentication transaction receipt and confirmation process 600 consistent with the disclosed embodiments. In some aspects, an authentication partner system (e.g., an authenticating partner system) may be configured to receive an authentication transaction request and associated data from client device 112 (step 602). The authentication transaction request may be configured in various formats or forms and may include information consistent with the disclosed embodiments (e.g., consistent with the embodiments disclosed in connection with FIG. 3). For example, the authenticating partner system may be configured to provide a web service or mobile application through which users input information associated with an authentication transaction request. In certain aspects, the authenticating partner system may be configured to receive an authentication transaction request and other information over any communications network consistent with the disclosed embodiments (e.g., WAN, LAN, cellular network, GSM network, Wifi, Bluetooth, I/O connection, etc.).

In certain embodiments, the authenticating partner system may be configured to perform processes that specify the information required to conduct or process the authentication transaction. For example, an authenticating partner system may generate information that is provided to client device 112 to request that a user (e.g., user 110) submit her name, address, social security number, date of birth, and driver's license number in order to initiate processes consistent with renewing the user's driver's license. The types of information required by the authenticating partner system may depend in part on the system (e.g., system requirements), a host associated with the system (e.g., internal requirements established by a business entity), the nature of the underlying authentication transaction (e.g., renewing a driver's license may require different information from opening a bank account), the client device from which the system receives the request (e.g., devices in high-risk areas), the user associated with the client device (e.g., high-risk individuals), and other factors consistent with the disclosed embodiments. In some embodiments, the authenticating partner system may be configured to decline, refuse, or prompt a user (e.g., via output to client device 112) for additional information if a received request does not comply with system requirements. In the example above, for instance, the authenticating partner system may be configured to decline the request or prompt a user for her address if the system does not receive the address information from client device 112.

In one aspect, the authenticating partner system may require the user to submit information related to another authentication partner system (e.g., an expected validating partner system). In certain aspects, the information related to another partner system may include the identity of the other system, any user data stored within the other system (e.g., account numbers, PINs, etc.), or any other information consistent with the disclosed embodiments. For example, if an authenticating partner system (e.g., system 132) receives an authentication transaction request consist with opening a bank account, the system may require the user to input the identity of another bank system at which the user holds an account, the account number, the routing number, etc. The authenticating partner system may require different kinds of information related to another partner system based on any factor consistent with the disclosed embodiments (e.g., the identity of the partner, the authentication transaction, etc.). In other aspects, the authenticating partner system may not require the user to submit any information corresponding to another authentication partner system. For example, an authenticating partner system may be configured to process authentication transactions without requiring information about another authentication partner system at the time the user submits an authentication transaction request.

In some embodiments, an authenticating partner system may be configured to generate an authentication code in response to receiving an authentication transaction request from client device 112 (step 604). The authentication code may take any form consistent with the disclosed embodiments (e.g., a visual, alphanumeric, symbolic expression, etc.), and may encode any information related to the authentication transaction request. The authenticating partner system may obtain the information related to the authentication transaction request from the request itself (e.g., as provided in the request from client device 112), from its data repositories (e.g., data repository 136), from its own processing, or from other computer systems consistent with the disclosed embodiments. For example, the authenticating partner system may receive a user's name and other user data from client device 112, and may generate the time of the request locally (e.g., on processors executing instructions on system 132).

In one embodiment, the generated authentication code may also include information defining or specifying one or more routing destinations for an authentication transaction. In some embodiments, the routing destinations may represent the authenticating partner system, another authentication partner system (e.g., a validating partner system storing information relevant to the authentication transaction), a client device 112 associated with the authentication transaction, and/or any other computer system consistent with the disclosed embodiments. For example, an authentication code may include information specifying the authenticating partner system (e.g., system 132) and validating partner system (e.g., system 142). In another example, the authentication code may only specify the authenticating partner system. The authentication code may include other information consistent with the disclosed embodiments.

In certain aspects, an authenticating partner system may be configured to provide a generated authentication code to client device 112 (step 606). The authenticating partner system may transmit the authentication code to client device 112 over any communications network consistent with the disclosed embodiments. In certain aspects, client device 112 may be configured to receive the authentication code provided by the authenticating partner system, store the code in memory, and use the authentication code to conduct processes disclosed herein. In other aspects, the authenticating partner system may provide an authentication code to a user in other media. For example, an authenticating partner system may provide an authentication code to a user on a physical document (e.g., mailed documents with an authentication code printed on the document), on physical media encoding the authentication code (e.g., a readable card, memory device, etc., sent to the user), or the like.

In some aspects, an authenticating partner system may be configured to receive a notification from a computing system of environment 100 reflecting that an authentication code generated by the authenticating partner system has been scanned and/or processed. In certain embodiments, the authenticating partner system may be configured to perform processes based on the receipt of the processed authentication code, authentication data, or other information. For example, an authenticating partner system may be configured to receive a notification from an authentication terminal 152 (e.g., over authentication network 120 or another network) reflecting that the terminal has processed and/or provided the code to the authentication network. In certain aspects, the authenticating partner system may be configured to provide information to another computing system based on the notification. For example, the authenticating partner system may send a confirmation to the authentication terminal 152 reflecting receipt of the notification, an authorization message to the validating partner system reflecting authorization to initiate validation processes (e.g., identified in information provided to the authenticating partner), or other information consistent with the disclosed embodiments.

In some embodiments, an authenticating partner system may be configured to receive an authentication code (e.g., the authentication code it generated), authentication data comprising the code, and/or validation information corresponding to the authentication code over network 120 (step 608). In certain aspects, the received validation information may originate from a validating partner system that validated the authentication transaction represented in the authentication code. The authentication data and validation information may take any form consistent with the disclosed embodiments. For example, the validation information may include a determination whether the authentication transaction has been validated and other information related to the validation or authentication determination.

In certain aspects, an authenticating partner system may be configured to conduct further processing upon receiving validation information and/or an authentication code from authentication network 120. In some aspects, the authenticating partner system may be configured to process the authentication transaction associated with the validation information, authentication data, and/or generated authentication code (step 610). In some embodiments, processing an authentication transaction may include determining whether to authenticate (e.g., approve) user 110 for the underlying authentication transaction. For example, an authenticating partner system may determine to approve a user for opening a bank account maintained on the system, and conduct processes required to establish the account (e.g., open the account, deposit a sum of money into the account, notify other computer systems of the new account, etc.). In certain aspects, the authenticating partner system may execute software instructions that perform approval processes that consider one or more factors to determine whether to approve and conduct an authentication transaction consistent with the disclosed embodiments (e.g., the authentication transaction, the authenticating partner system, etc.). For example, in an authentication transaction consistent with renewing a driver's license, the authenticating partner system (e.g., a DMV) may be configured to update its databases, print a new driver's license, transmit information to other computer systems, and the like.

In certain embodiments, the determination whether to approve the authentication transaction may be based in part on the validation information received from network 120. In one embodiment, an authenticating partner system may be configured to approve an authentication transaction when the received validation information indicates that the transaction has been validated (e.g., by a validating partner system). For example, an authenticating partner system (e.g., system 132) may be configured to approve a user's application for credit when a validating partner system (e.g., system 142) validates the transaction.

In some aspects, an authenticating partner system may also approve an authentication transaction when information included in the validation information or authentication data (e.g., a user's PIN, account numbers, other user data, etc.) is consistent with user data stored within the authenticating system (e.g., in data repository 136). For example, an authenticating partner system may be configured to compare information included in the validation information with user data stored in its data repositories (e.g., name, address, Social Security Number, account numbers, etc.), determine whether the data sets are consistent, and approve the authentication transaction based on the determination. In another example, the authentication partner system may be configured to compare the received authentication data (or authentication data) against information stored in the system (e.g., user data, authentication code data) to determine whether, for example, the data match, the data are consistent, and the like.

In some embodiments, an authenticating partner system may be configured to determine whether to approve an authentication transaction based on other factors. In one aspect, an authenticating partner system may be configured to receive, obtain, store, and/or generate one or more authentication conditions governing whether an authentication transaction should be approved. In certain aspects, an authentication partner system may be configured to approve an authentication transaction only when the one or more authentication conditions are satisfied. In certain aspects, the authentication conditions may include any validation condition consistent with the disclosed embodiments. For example, the authentication conditions may include a time condition, location condition, entity condition, entity type condition, validator condition, frequency condition, necessary data condition, etc. specifying times, places, and frequencies in which transaction events consistent with the disclosed embodiments must occur. The authenticating partner system may be configured to compare the validation information, authentication data, and/or authentication code against the authentication parameters to determine whether to approve the authentication transaction.

In some embodiments, an authentication partner system may store the one or more authentication conditions as user data within a data repository (e.g., repository 136). In certain aspects, an authentication partner system may receive one or more authentication conditions from client device 112 (e.g., via a communications network). In certain embodiments, the authentication partner system may generate one or more of the authentication conditions. In one aspect, the authenticating partner system may be configured to allow a user to add, delete, edit, or modify the authentication conditions (e.g., via an interface provided to client device 112).

In certain aspects, an authenticating partner system may include both validation conditions and authentication conditions. In some embodiments, the two sets of conditions may operate independently from one another. For example, in one embodiment, an authentication partner system include validations conditions authorizing the system to validate an authentication transaction within a first time frame, but may include authentication conditions permitting the system to authenticate (e.g., approve) another authentication transaction within a second time frame. In another example, an authenticating partner system may include authentication conditions specifying that the system may authenticate (e.g., approve) any authentication transaction, but may validate authentication transactions associated with a designated geographical area. Other combinations and permutations are possible.

In some embodiments, an authenticating partner system may be configured to generate an authentication confirmation reflecting whether the authentication transaction has been validated and/or approved. In certain aspects, the authenticating partner system may be configured to provide the authentication confirmation (step 612). For example, the authentication partner system may be configured to provide the authentication confirmation to authentication network 120 (e.g., where it may be routed to an appropriate system), or directly to another computing system (e.g., to client device 112 via a communications network, such as the internet). The authentication confirmation may be formatted in various forms consistent with the disclosed embodiments (e.g., an e-mail, SMS text, voice mail, audial tone, vibration, etc.).

Figure 7:
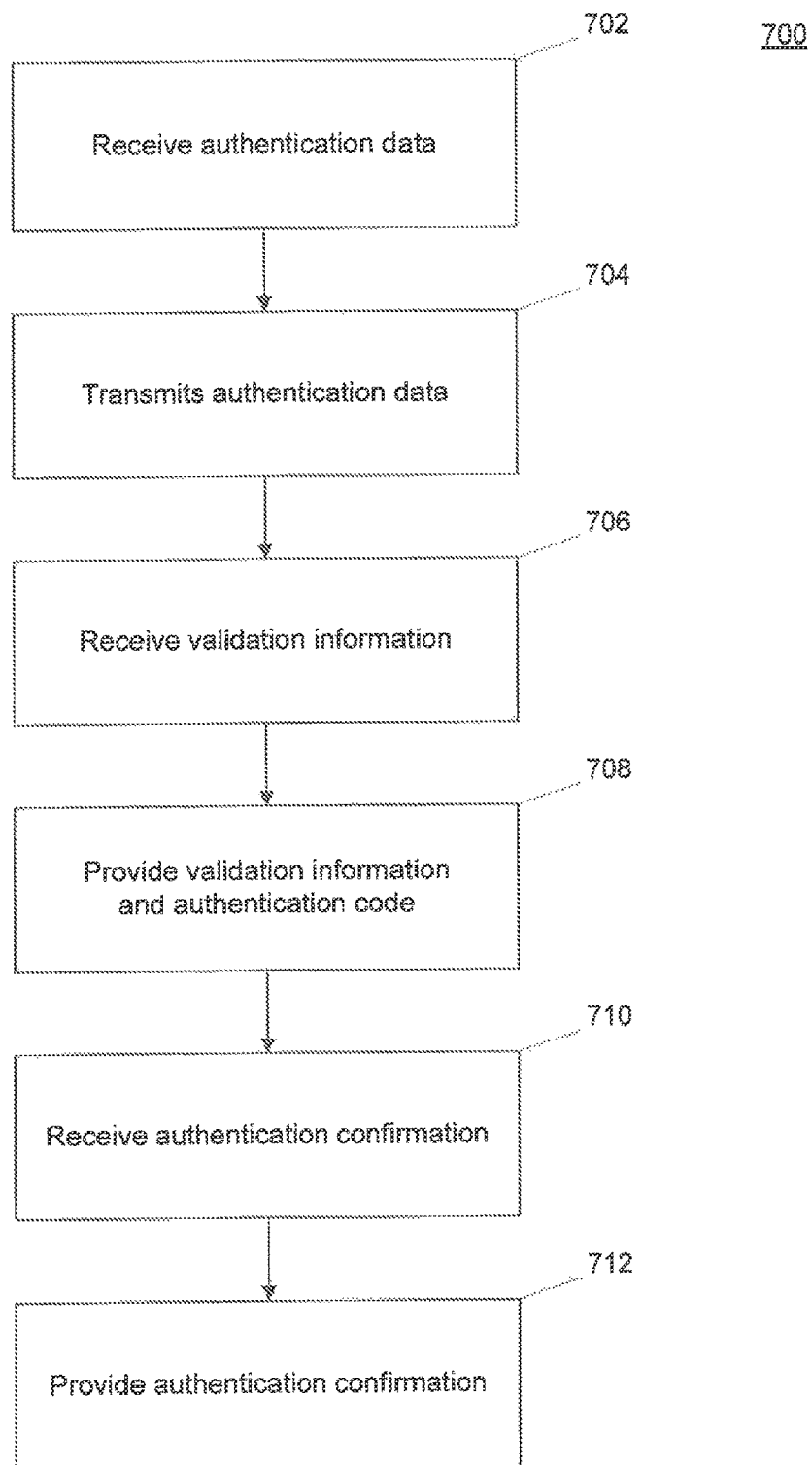
FIG. 7 depicts a flowchart of an exemplary authentication network data transmission process consistent with the disclosed embodiments.

Aspects of the disclosed embodiments include systems, methods, and apparatuses for providing a trusted authentication network for validating and authentication users. FIG. 7 depicts a flowchart of an exemplary authentication network data transmission process 700 consistent with disclosed embodiments. In certain aspects, the authentication network 120 may include any communications network consistent with the disclosed embodiments, and may be secured via methods known to one of ordinary skill in the art. In some embodiments, the authentication network 120 may serve as a communications network between a plurality of computing systems consistent with the disclosed embodiments (e.g., the computing systems described in connection with FIG. 1). For example, in one aspect, authentication network 120 may be configured to connect one or more client devices 112, one or more authentication terminals 152, and/or one or more authentication partner systems (e.g., system 132 and 142).

In certain embodiments, authentication network 120 may be configured to receive authentication data from a connected computing system (e.g., an authentication terminal 152, client device 112, etc.) (step 702). The authentication data may comprise any data consistent with the disclosed embodiments, such as an authentication code and accompanying information. In some embodiments, authentication network 120 may determine that the authentication data corresponds to an authentication transaction (e.g., as opposed to a payment transaction) based on processing the authentication data (e.g., the data includes information inconsistent with a payment transaction), or other input received. For example, in one embodiment, an operator of an authentication terminal 152 may provide input to the terminal reflecting that the authentication data transmitted to network 120 relates to an authentication transaction as opposed to another type of transaction. In other instances, and based on the input provided by the operator, authentication terminal 152 may assign a predetermined value indicative of an authentication transaction (and/or to a payment transaction) to an identifier or code (e.g., a portion of the authentication code), and authentication terminal may include the identifier or code within a portion of the authentication data transmitted to network 120 (e.g., within a header of packetized data transmitted to network 120).

In some aspects, authentication network may be configured to perform processing on the authentication data to determine one or more proper destination system(s) to which to route the authentication data. In some aspects, the proper destination systems may include one or more authentication partner systems, authentication terminals 152, or any other computing device connected to network 120. For example, in one embodiment, proper destination systems may include an authenticating partner system, a validating partner system, and an authentication terminal in communication with the network. In other aspects, a proper destination system may include only a validating partner system.

In certain aspects, the proper destination system(s) may include systems storing information relevant to the validation and/or authentication of the authentication transaction. For example, in an authentication transaction reflecting a user's request to open a new account at a first bank, authentication network 120 may be configured to route authentication data associated with the transaction to a second bank providing financial account services for the user. In another example, in an authentication transaction reflecting a user's request to renew her driver's license, authentication network 120 may be configured to route authentication data associated with the request to systems associated with a DMV, a court, insurers, and/or any entity storing information relevant to a user's identity, driving record, etc.

In some embodiments, authentication network 120 may be configured to determine the proper destination system(s) based on processing the authentication data. In some aspects, the processed authentication data may include an authentication code in which one or more destination systems may be encoded (e.g., by an authenticating partner system). In other embodiments, one or more of the destination system(s) may be included in the information accompanying the authentication code in the authentication data provided to the network. In one exemplary embodiment, a user may swipe a transaction card at an authentication terminal 152 connected to the authentication network 120. In certain aspects, the authentication terminal 152 may collect information from the transaction card or account (e.g., the issuing bank, the routing number, account number, expiration date, security codes, etc.), and the information provided therein may reflect the destination system(s) required for authentication network 120. In another example, the one or more destination system(s) may be provided in the authentication data received from an authenticating partner system (e.g., providing the authentication code to the user), an authentication terminal 152 (e.g., from local processes conducted at the terminal), a client device 112, and the like.

In certain embodiments, authentication network 120 may be configured to determine the one or more destination system(s) based on other information and processes available to the network. In some embodiments, network 120 may be configured to interpret the information included in the authentication data (e.g., the authentication code and other information), and determine the system connected to the network best suited to validate the authentication transaction identified in the authentication data. By way of example, the authentication data may include an identifier or other code having a predetermined value (e.g., assigned by authentication terminal 152) indicative of an association between the authentication data and a corresponding authentication transaction (or a corresponding payment transaction). Based on the predetermined value, authentication network 120 may associate the authentication data with the corresponding authentication (or payment) transaction, and may route the authentication data to a destination system capable of perform the corresponding authentication (or payment) transaction.

In additional aspects, authentication network 120 may be configured to determine that received authentication data corresponds to a particular authentication transaction associated with a certain system (e.g., a particular entity) or class of systems (e.g., financial institutions, government agencies, etc.), and route the authentication data accordingly. Further, in other aspects, the network 120 may be configured to determine the identity of the user associated with the transaction (e.g., by processing the authentication data), and route the authentication data to a destination system (e.g., a validating partner system) known to include validation data corresponding to a prior authentication of the user.

In some aspects, information associated with known authentications and validations (e.g., both approved and rejected) may be stored in authentication databases included in a computing system connected to network 120 (e.g., an authentication partner system, a standalone database, etc.). In some embodiments, authentication databases may reflect data repositories in which information related to any authentication or validation process may be stored (e.g., user data, authentication data, validation data, authentication confirmations, system identities, etc.). In certain embodiments, computing systems connected to the authentication network 120 (e.g., an authentication partner system) may be configured to update the authentication databases as authentication transactions are processed over the network. Information associated with known authentications may be stored in several databases stored among any number of authentication partner systems. In other aspects, all of the authentication databases may be stored in a single authentication partner system configured to validate every authentication transaction processed over network 120.

In some embodiments, an authentication database or other computing system (e.g., an authentication partner system) may be configured to distinguish authentication transactions that have been independently verified and those that have not. For example, an authentication partner system associated with network 120 may be configured to determine the authentication transactions authenticated or validated solely over network 120, and those authenticated in other processes (e.g., at a brick and mortar locations requiring physical inspection of the relevant authenticating documents). In certain aspects, authentication network 120 may be configured to determine the proper destination systems based in part on whether an authentication or validation has been independently verified. For example, in one embodiment, authentication network 120 may be configured to route authentication data to a first system having independently verified an authentication transaction over a second system that authenticated a transaction based solely over the network (e.g., based on the first system's authentication).

In certain embodiments, the authentication network 120 may be configured to determine a set of all the potential validating partner systems for a given authentication transaction. In some aspects, the network 120 may be configured to rank, sort, score, rate and/or otherwise distinguish the potential validating partner systems included in the determined set. In certain aspects, authentication network 120 may be configured to perform processes that base its ranking, scoring, etc. on one or more factors consistent with the disclosed embodiments. For example, authentication network 120 may rank, sort, etc. potential validating systems based on factors such as a quantity and/or quality of validation data stored in the system (e.g., for the particular user, for the transaction, for a class of transactions, for all users generally, etc.), the number or rate of positive validations leading to an approved authentication (e.g., to assess the reliability of the system), whether the validations or validation data have been independently verified, the identity of the authentication partner associated with the system (e.g., a financial institution may be more highly ranked than an individual person, etc.), and the like. In some embodiments, authentication network 120 may be configured to route authentication data only to a subset of the potential validating partners (e.g., the highest rated validating partner system, the first two partner validating partner systems that have independently verified data, etc.). In other aspects, authentication network 120 may route the authentication to all of the potential validating partner systems.

In some aspects, the authentication network 120 may be configured to route the authentication data to one or more of the identified proper destination systems (step 704). The destination systems may be configured to execute software instructions that perform one or more processes consistent with the disclosed embodiments. For example, one or more destination systems may perform validation processes configured to validate an authentication transaction represented in the authentication data (e.g., validating partner systems implementing process 500). In certain aspects, the authentication network 120 may be configured to receive validation information generated by one or more of the validating partner systems (step 706). The validation information received may include any data consistent with the disclosed embodiments (e.g., a determination whether to validate the authentication transaction, other associated data, etc.).

In some aspects, an authentication partner system and/or an authentication terminal 152 in communication with authentication network 120 may be configured to generate validation information by obtaining validation data (not validation information) from other network systems. In some embodiments, for example, the authentication partner system may use the routing information to determine one or more system(s) most likely to include validation data, and obtain the information from those systems over network 120. In one example, an authentication partner system may determine that a particular DMV has validation data most relevant to an authentication transaction it is processing. In certain aspects, the authentication partner system may be configured to obtain, collect, gather, and store the information from systems associated with the DMV without routing any information (e.g., authentication data) to the DMV. In certain embodiments, any authentication partner system may implement these aspects to gather validation data (e.g., user data, etc.) from any other network system. In some embodiments, authentication terminal 152 may be configured to obtain, receive, generate, and/or process validation data and/or validation information in the same manner. A validating partner system (e.g., system 132, system 142, terminal 152, etc.) may obtain some or all of its validation data in this manner. In some aspects, authentication partner systems may limit this data gathering process by, for example, establishing standards, conditions, limits, prohibitions, or other rules governing the exchanging of information between systems.

In certain aspects, authentication network 120 may be configured to route the validation information (generated or received) and/or other data received (e.g., authentication data, an authentication code, etc.) to one or more destination systems (step 708). In some embodiments, the destination systems may include other validating partner system(s) (e.g., to verify the validation information, etc.), an authenticating partner system (e.g., to authenticate a transaction), or any other computing system in communication with network 120 (e.g., a client device 112 or authentication terminal 152).

In some embodiments, authentication network 120 may be configured to determine the one or more destination system(s) consistent with the disclosed embodiments (e.g., in a similar manner as the network determined the destination(s) of the authentication data in step 704). In one embodiment, authentication network 120 may be configured to determine the destination systems based on processes conducted on the validation information. For example, the validation information may include routing data (e.g., generated by the validating partner system). In another example, validation information may include information from which the routing information may be derived. In some aspects, network 120 may also be configured to determine the destination systems based on other information available in the authentication network (e.g., known authentication information, authentication databases connected to the network, independent verification data, etc.).

In one aspect, the destination system of the validation information and/or other information (e.g., authentication data) may be configured to perform additional processing on the data received from network 120. In some embodiments, the destination system includes an authenticating partner system configured to process authentication transactions. In certain embodiments, the authenticating partner system may be configured to authenticate (e.g., approve) authentication transactions based in part on the information received from network 120 (e.g., in an authentication process 610). In some aspects, the authenticating partner system may be configured to generate authentication confirmations representing whether the authentication transaction has been validated or authenticated (e.g., in process 612). In some embodiments, the authentication network 120 may be configured to receive an authentication confirmation generated in an authentication partner system (step 710). The authentication confirmation may take any form consistent with the disclosed embodiments.

In some aspects, the authentication network 120 may be configured to provide a received authentication confirmation to one or more destination systems in communication with the network (step 712). For example, network 120 may be configured to provide an authentication confirmation to an authentication terminal 152, an authentication partner system (e.g., system 132), or the like. The network 120 may be configured to determine the identity of the destination systems using any process consistent with the disclosed embodiments (e.g., processing the authentication confirmation, processing other data such as the authentication data or validation information, authentication databases, etc.).

Figure 8:
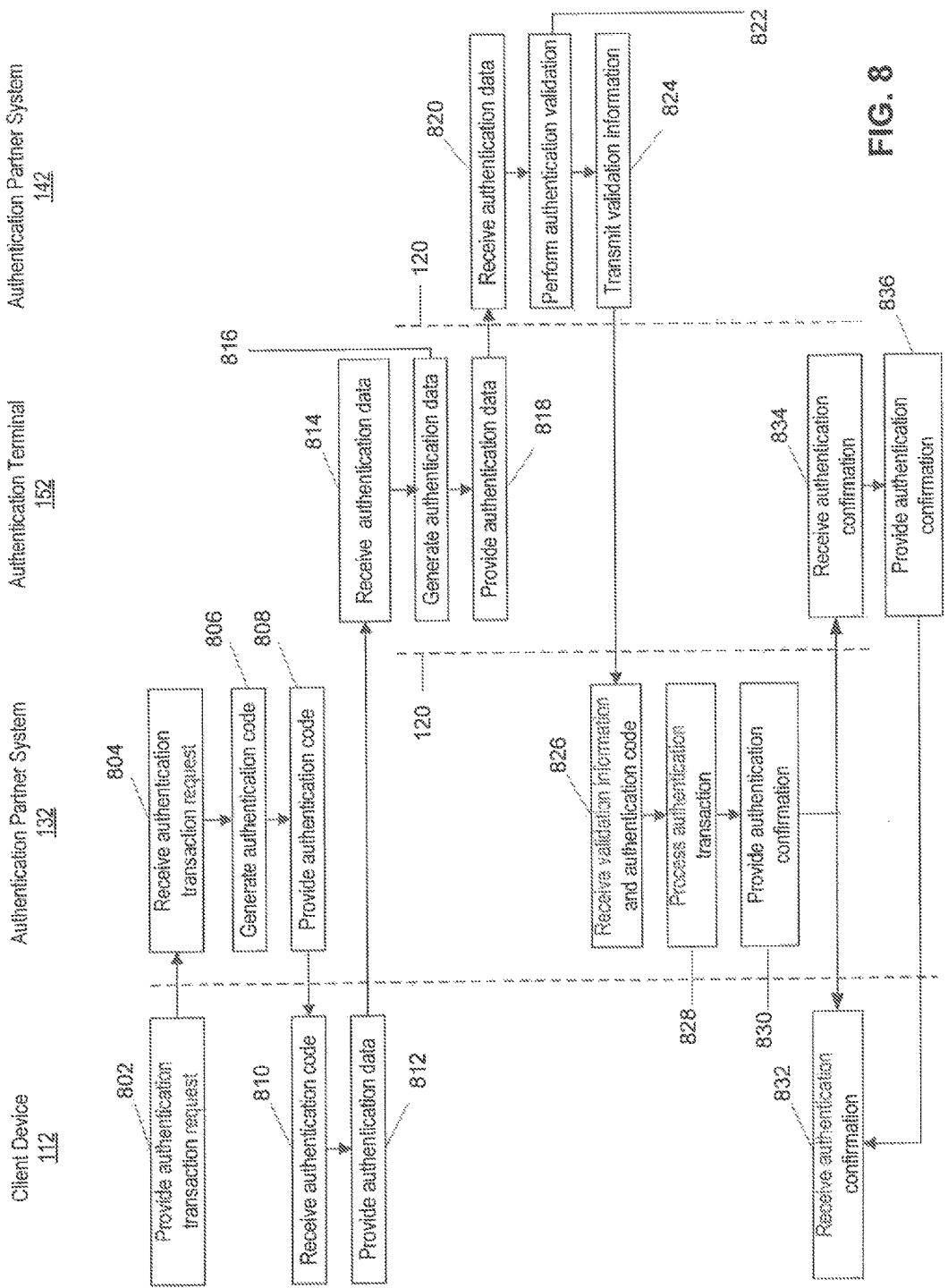
FIG. 8 depicts a flowchart of an exemplary authentication transaction approval process consistent with the disclosed embodiments.

The above exemplary processes and systems are not limiting to the disclosed embodiments. For example, FIG. 8 shows a diagram of an exemplary authentication transaction approval process 800 consistent with the disclosed embodiments. The embodiments disclosed in connection with FIG. 8 may represent one exemplary aspect of how the disclosed embodiments may authenticate an authentication transaction, and the recitation of certain processes or systems is for exemplary purposes only. In certain aspects, user 100 may initiate processes consistent with approving an authentication transaction by providing an authentication transaction request from client device 112 to an authenticating partner system (e.g., system 132) (step 802). The authentication transaction request may take any form consistent with the disclosed embodiments, and may be provided over any communications network (e.g., WAN, LAN, wireless, network 120, etc.) consistent with those disclosed herein.

In some embodiments, the authenticating partner system (e.g., an authentication partner system 132) may be configured to receive the transaction request over the communications network (step 804). The system may be configured to generate an authentication code identifying the authentication transaction, and, in some embodiments, encoding additional information (step 806). The authentication code may take any form consistent with the disclosed embodiments (e.g., an alphanumeric, visual, symbolic, pictorial expression, etc.). The authenticating system may be configured to provide the generated authentication code over the communications network to client device 112 for further processing (step 808).

In certain embodiments, client device 112 may be configured to receive the authentication code (step 810). Client device 112 may conduct further processing on the code, and provide authentication data to an authentication terminal 152 (step 812). In some embodiments, the authentication data may comprise the authentication code and other information generated or received by client device 112 (e.g., information received from the authenticating partner system, user data such as client device information, a user's personal information, etc.). In some aspects, client device 112 may provide the authentication data to authentication terminal 152 over any communications network consistent with the disclosed embodiments. In other aspects, client device 112 may provide the authentication to network 120 directly, without an intermediate authentication terminal 152.

In some embodiments, an authentication terminal 152 may be configured to receive the authentication data over the communications network (step 814). In certain aspects, the authentication terminal may conduct further processing on the authentication data, and may generate and/or receive additional authentication data (step 816). For example, the authentication terminal 152 may be configured to generate authentication data reflecting the time, place, and manner in which it received the authentication data from client device 112 (e.g., the time of the data exchange, the place of the data exchange, an entity associated with the authentication terminal, an entity type associated with the entity, terminal information, etc.). In some aspects, the authentication terminal 152 may provide the authentication data (both received and generated) to an authentication network 120 (step 818).

In certain aspects, authentication network 120 may be configured to provide the authentication data to an appropriate computing system. The authentication network 120 may determine the appropriate computing system using any method consistent with the disclosed embodiments (e.g., encoding within the authentication data, etc.). In some embodiments, the appropriate computing system may include a validating partner system (e.g., system 142) storing information corresponding to a prior authentication event associated with user 110.

In some aspects, the validating partner system may be configured to receive the authentication data over network 120 (step 820). In certain embodiments, the validating partner system may be configured to validate authentication transactions consistent with the disclosed embodiments (step 822). In certain aspects, the validating partner system may be configured to generate validation information reflecting in part a determination whether to validate the user for the authentication transaction. The validation information may include any other information consistent with the disclosed embodiments. In certain embodiments, the validating partner system may transmit the generated validation information to the authentication network 120.

The authentication network 120 may be configured to route the validation information to another appropriate computing system. In certain aspects, the appropriate party may include another validating partner system (e.g., to validate a prior validation). In other aspects, the appropriate party may include the authenticating partner system. Authentication network 120 may be configured to determine the identity of the appropriate destination system using any process consistent with the disclosed embodiments.

In certain aspects, the appropriate system may include an authenticating partner system configured to receive the validation information and/or authentication code from authentication network 120 (step 826). In some embodiments, the authenticating partner system may be configured to process the authentication transaction based in part on the received validation information and authentication code (step 828). In some aspects, this processing may reflect a determination whether to approve user 110 for the underlying authentication transaction. The determination may be based on any process consistent with the disclosed embodiments (e.g., based on whether the validating partner system validated the transaction, whether the validation data and/or authentication data is consistent with user data stored on the authenticating partner system, whether all validation and authentication conditions have been satisfied, etc.). In certain aspects, the authenticating partner system may be configured to generate an authentication confirmation reflecting whether the authentication transaction has been approved. In some embodiments, the system may provide the confirmation to client device 112 (e.g., over a communications network), to authentication terminal 152 (e.g., over the authentication network 120), or another computing system.

In certain embodiments, client device 112 may be configured to receive an authentication confirmation either directly from the authenticating partner system (step 832), or from an authentication terminal configured to receive and provide the confirmation (steps 834 and 836). The authentication terminal may provide the confirmation to client device 112 over any communications network.

Figure 9:
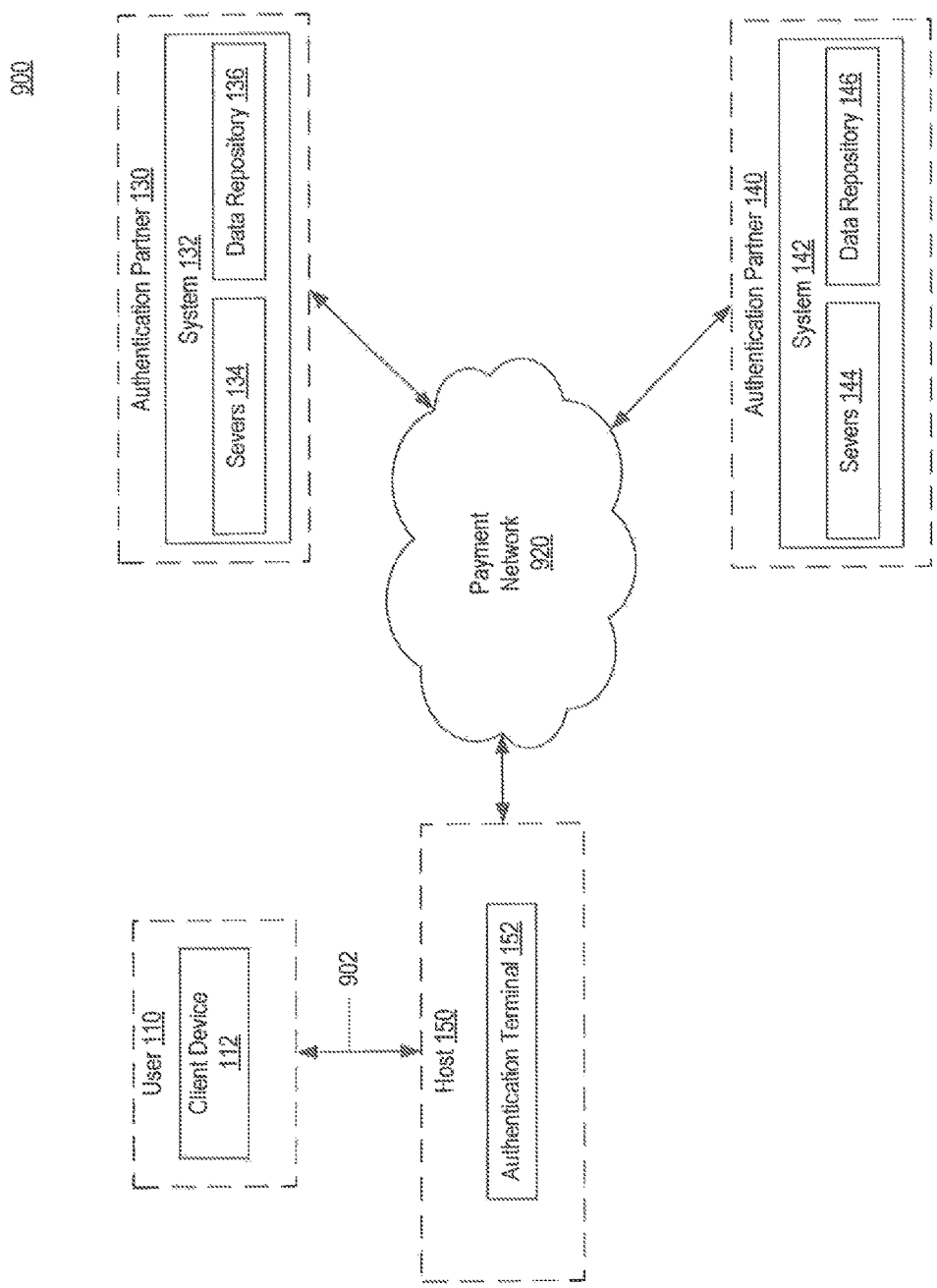
FIG. 9 depicts an exemplary payment network environment consistent with the disclosed embodiments.

FIG. 9 depicts an exemplary payment network environment 900 consistent with disclosed embodiments. In one aspect, environment 900 may include one or more client devices (e.g., client device 112) which may be associated with respective one or more users (e.g., user 110), one or more authentication partner systems (e.g., systems 132 and 142) which may be associated with respective one or more authentication partners (e.g., authentication partners 130 and 140), one or more authentication terminals (e.g., authentication terminal 152) which may be associated with one or more hosts (e.g., host 150), and one or more payment networks (e.g., network 920) connecting one or more of the components of environment 900. The components of environment 900 may include or implement any of the systems, technologies, processes, information, and functionalities consistent with the disclosed embodiments (e.g., consistent with the embodiments disclosed in connection with FIGS. 1-8).

Payment network 920 may include any payment technology network consistent with the disclosed embodiments, such as payment technologies associated with financial account payment service providers (e.g., VISA™, Mastercard™, etc.). The payment network 920 may include or implement any of the computing systems, processes, and functionalities associated with an authentication network 120 (e.g., servers, computing systems configured to process information, etc.), and vice versa. The payment network may be configured to process information consistent with known processes, and route the information to destination systems for further processing accordingly.

Environment 900 may also include one or more connections (e.g., connection 902) configured to obtain and transmit information from items associated with a user (e.g., client device 112, transactions cards, paper documents, licenses, readable chips, etc.) to the authentication terminal 152. In certain aspects, connection 902 may include any network, link, port, cable, detector, receiver, reader, scanner, or data exchange device consistent with the disclosed embodiments. In some aspects, connection 902 may include a communications network such as a WAN, LAN, MAN, wireless LAN, RF network, cellular network, NFC link, wired connection, etc. In certain embodiments, connection 902 may also represent auxiliary devices configured to obtaining and processing data from (e.g., card readers, scanners, imagers, etc.). For example, in one aspect, connection 902 may include a card reader configured to read and process information contained in a user's transaction cards (e.g., debit cards, credit cards, library cards, licenses, student IDs, etc.), and provide information to authentication terminal 152. In other aspects, connection 902 may include any other scanner or imager configured to gather information from papers, people, or objects (e.g., code scanners, image scanners, biometric scanners, etc.). In some embodiments, connection 902 may represent a plurality of connections (e.g., a card reader and code scanner, etc.).

In certain embodiments, connection 902 may be configured to obtain information from items associated with user 110 to gather and generate authentication data. For example, authentication terminal 152 may implement a card reader (e.g., as connection 902) to obtain information from a user's transaction card such as the card number, card name, issuing bank, account number, routing number, expiration data, security codes, or any other information stored on a user's transaction card. In certain aspects, authentication terminal 152 may be configured transmit a user's card information to the payment network 920 (e.g., within authentication data reflecting an authentication transaction) for use in processes consistent with the disclosed embodiments. For example, authentication terminal 152 may be configured to receive authentication data including an authentication code created by an authenticating partner system (e.g., system 132), generate additional authentication data (e.g., card information obtained via a card reader, a PIN input into the terminal via a keyboard, etc.), and transmit the combined authentication data to payment network 920.

Figure 10:
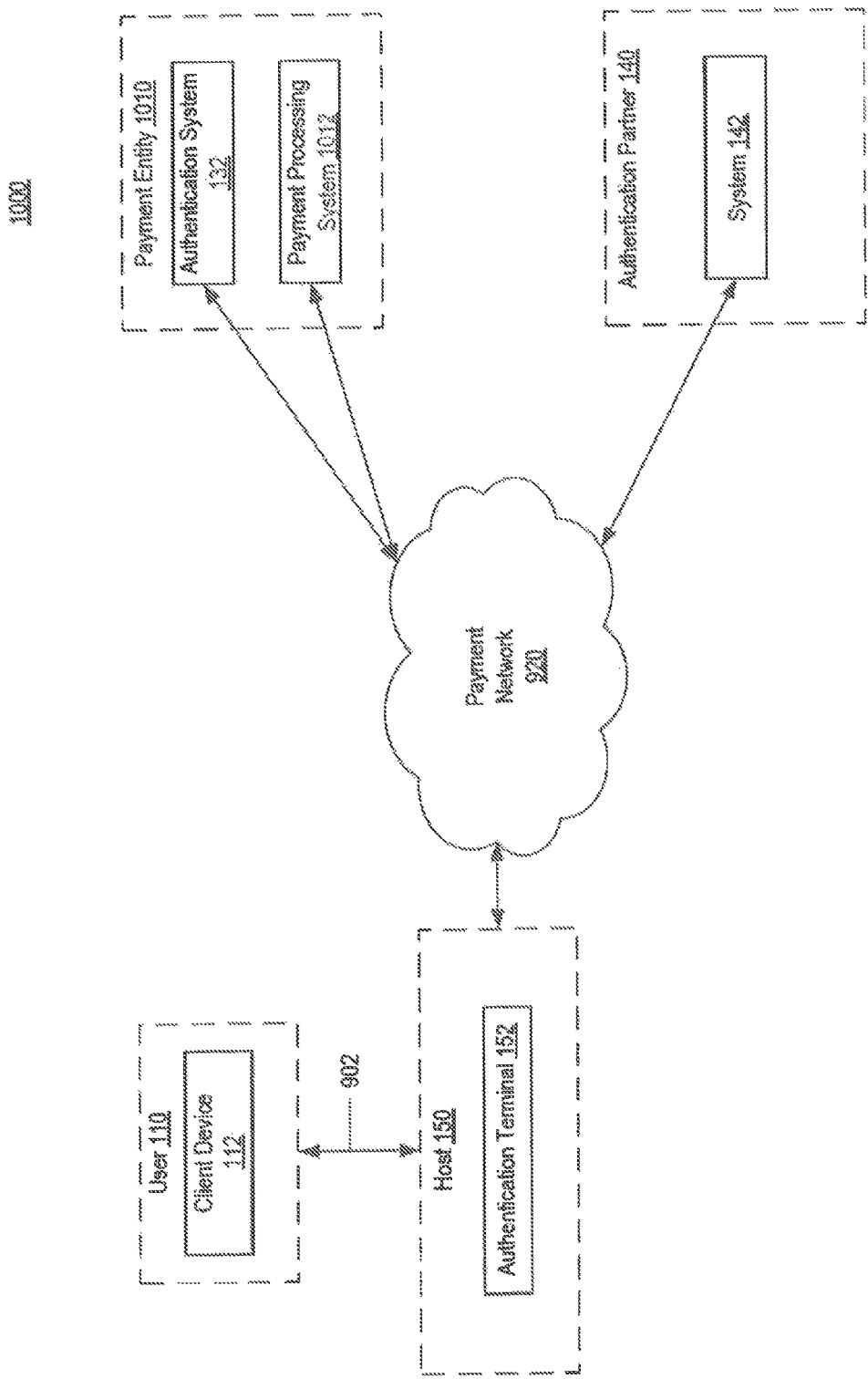
FIG. 10 depicts an exemplary network routing environment consistent with the disclosed embodiments.
Figure 11:
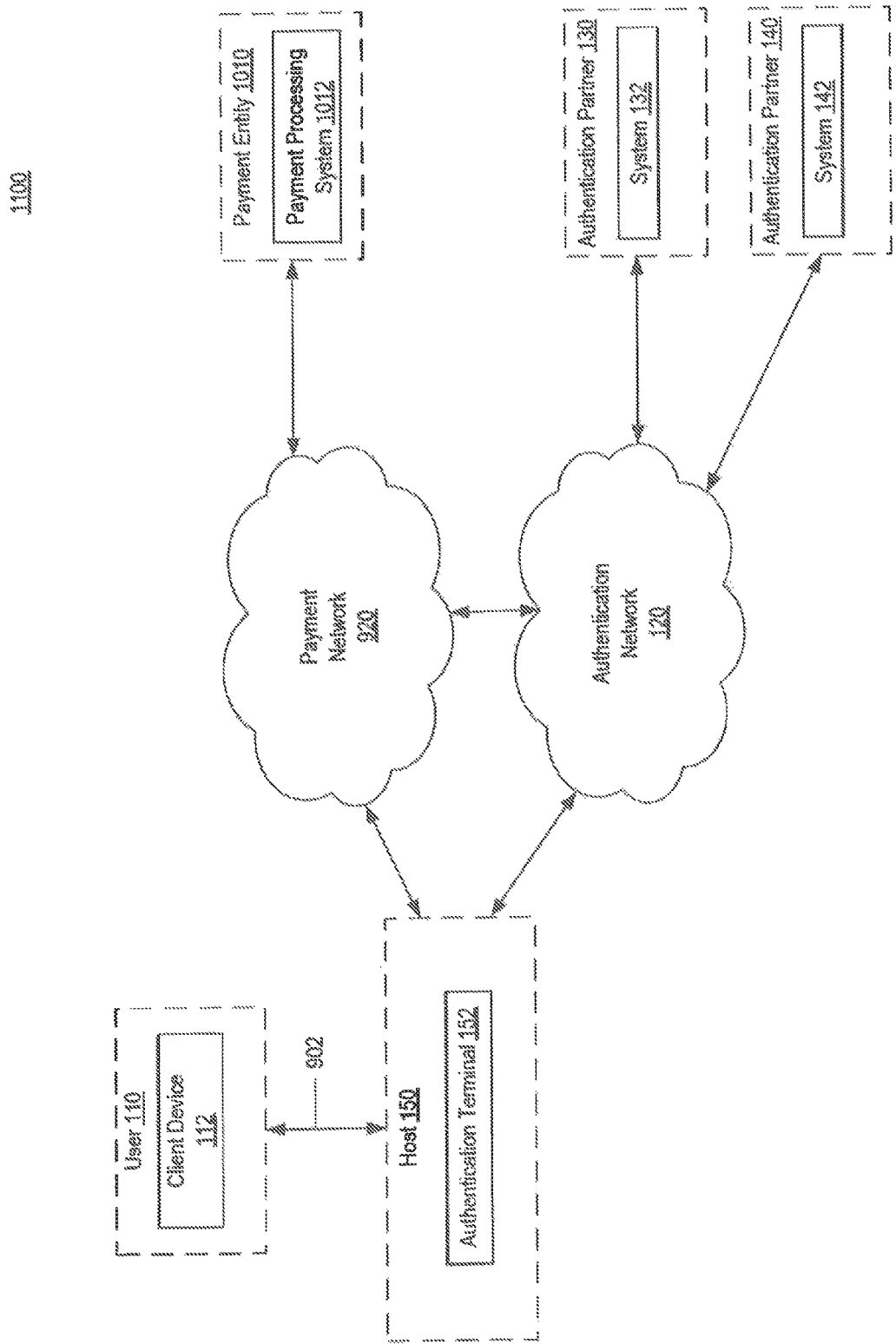
FIG. 11 depicts an exemplary multi-network environment consistent with the disclosed embodiments.

In one aspect, payment network 920 may be configured to identify that received authentication data corresponds to an authentication transaction (e.g., as opposed to a payment transaction) using any process consistent with the disclosed embodiments (e.g., based on a nature of the authentication data, input from an operator at authentication terminal 152, and/or values of identifiers and/or other codes included within the authentication data, as disclosed in connection with FIGS. 10 and 11). In some aspects, payment network 920 may route the authentication data to a validating partner system (e.g., system 142) associated with an institution issuing the transaction card using known payment routing processes. In certain aspects, the issuing bank's computing systems may represent a validating partner system configured to receive and validate authentication transactions. In some embodiments, the bank's validating partner systems may be configured validate authentication transactions reflected in the authentication data incorporating the user's card information. In some aspects, the validating partner system associated with the issuing bank may validate an authentication transaction (in whole or part) using may process consistent with the disclosed embodiments. The validating partner system may create validation information consistent with the validation, and transmit the validation information to payment network 920. In some embodiments, the validating partner system may generate the validation information such that a payment network (e.g., network 920) may recognize and interpret the included information.

In certain aspects, payment network 920 may be configured receive the validation information and recognize that the validation information corresponds to an authentication transaction (e.g., in a manner consistent with the foregoing embodiments). In some embodiments, the payment network 920 may route the validation information to another computing system in a manner consistent with the disclosed embodiments (e.g., to another validating partner system, to an authenticating partner system etc.). For example, payment network 920 may route the validation information to the authenticating partner system that generated the authentication code (e.g., system 132). In certain aspects, the authenticating partner system may be configured to process the validation information consistent with the disclosed embodiments to authenticate the authentication transaction.

In some embodiments, the authenticating partner system may generate an authentication confirmation consistent with the disclosed embodiments, and provide the confirmation to payment network 920. In certain aspects, payment network 920 may be configured to recognize the authentication confirmation, and route the confirmation to any computing device in connection with the network. For example, in one aspect, payment network may route the authentication confirmation to authentication terminal 152. In certain embodiments, authentication terminal 152 may be configured to provide a confirmation to the user (e.g., via connector 902 such as a communications network), or otherwise indication that the authentication confirmation has been approved or denied (e.g., via a display on authentication terminal 152). In some embodiments, payment network 920 may be configured to route the authentication confirmation other computing systems, such as an authentication partner system including an authentication database, for further processing.

FIG. 10 depicts an exemplary network routing environment 1000 consistent with the disclosed embodiments. In one aspect, environment 1000 may include one or more client devices (e.g., client device 112) which may be associated with respective one or more users (e.g., user 110), one or more authentication partner systems (e.g., systems 132 and 142) which may be associated with respective one or more authentication partners (e.g., partner 140), one or more authentication terminals (e.g., authentication terminal 152) which may be associated with one or more hosts (e.g., host 150), one or more connections (e.g., connection 902) facilitating information transfer between the client devices and authentication terminals, and one or more payment networks (e.g., payment network 920) connecting one or more of the components of environment 1000. The components of environment 1000 may include or implement any of the systems, technologies, processes, information, and functionalities consistent with the disclosed embodiments (e.g., consistent with the embodiments disclosed in connection with FIGS. 1-9). Moreover, while certain features of FIG. 10 may be described with reference to payment network 920, aspects consistent with the disclosed embodiments may include the same features taking place over an authentication network (e.g., authentication network 120).

In some aspects, environment 1000 may include one or more payment processing systems 1012. In certain embodiments, a payment processing system 1012 may include one or more computing systems configured to receive and process payment transactions consistent with the disclosed embodiments (e.g., debit card transactions, credit card transactions, etc.). For example, in one aspect, a payment processing system 1012 may include computing systems associated with a financial institution for processing credit or debit card transactions.

In some embodiments, a payment processing system 1012 may be associated with a payment entity 1010. A payment entity 1010 may include any business, enterprise, financial institution, educational institution, government agency, or any other entity providing payment processes for users (e.g., debit card transactions, credit card transactions, loyalty account transactions, gift card transactions, student account transactions, etc.). In some embodiments, payment entity 1010 may comprise an authentication partner (e.g., partner 130) associated with an authentication partner system (e.g., system 132). For example, in one embodiment, payment entity 1010 may reflect an authentication partner system associated with systems configured to process both authentication transactions (e.g., an authentication partner system) and payment transactions (e.g., account card purchases). In other embodiments, a payment entity 1010 may not comprise an authentication partner, and/or may not include an authentication partner system. For example, in one embodiment, a payment entity 1010 may not be configured to process authentication transactions, and thus may not include an authentication partner system.

In some embodiments, the components of environment 1000 may be configured to determine whether a particular transaction reflects an authentication transaction (or processes associated therewith) or a payment transaction (or processes associated therewith), and process the transaction accordingly (e.g., route the transaction to an appropriate computing system). In certain aspects, for instance, authentication terminal 152 may be configured to receive information associated with a transaction and determine whether the transaction reflects an authentication transaction or a payment transaction. In one example, authentication terminal 152 may be configured to determine whether a transaction constitutes an authentication transaction or payment transaction based on received authentication data (e.g., information encoded in an authentication code, generated authentication data, etc.).

In another example, authentication terminal 152 may determine the transaction type based on transaction information provided to the terminal via an input device such as a keyboard, display, terminal buttons, auxiliary devices (e.g., a separate apparatus provided by a third party), and the like. For example, in one aspect, authentication terminal 152 may be configured to provide a user interface onto a display, wherein the user interface is configured to receive input specifying whether a transaction reflects an authentication or payment transaction (e.g., via text fields, radio buttons, checkboxes, GUI buttons, etc. provided on the display). In this example, authentication terminal 152 may be configured to associate a subsequent action (e.g., providing authentication data, swiping an account card, providing additional inputs or information to the terminal, etc.) with an authentication transaction or a payment transaction based on the received input, and process the transaction consistent with the disclosed embodiments.

In some aspects, authentication terminal 152 may be configured to modify the information it provides to payment network 920 (or, in certain embodiments, authentication network 120), based on a determined transaction type. In some embodiments, for instance, authentication terminal 152 may be configured to alter, modify, change, select, and/or demarcate information provided to payment network 920 to indicate that a particular transaction reflects either an authentication transaction or a payment transaction. For example, in some aspects, authentication terminal 152 may be configured to modify packet structures typically associated with a payment transaction (e.g., by appending, prepending, and/or inserting packet headers, footers, or other data, modifying existing data in the packet structure, etc.) to indicate that a transaction reflects an authentication transaction. In certain embodiments, authentication terminal 152 may modify or configure the authentication data provided to the payment network 920 to indicate the nature of the transaction. In these examples, the authentication or payment network processing the transaction may be configured to route and/or process the provided information consistent with the disclosed embodiments.

In certain aspects, an authentication network or payment network (e.g., payment network 920) may be configured to determine whether a transaction reflects an authentication or payment transaction. In some aspects, the network processing the transaction (e.g., payment network 920) may be configured to make this determination in addition to, or in lieu of, other determinations made with components of environment 1000 (e.g., an authentication terminal 152). In some embodiments, the payment network may base its determination on the authentication data received from an authentication terminal 152. For example, in one aspect, payment network 920 may receive authentication data from a transaction terminal 152 without the terminal specifying whether a particular transaction reflects an authentication or payment transaction. In this example, payment network 920 may be configured to receive the authentication data and determine the transaction type based on data encoded in the authentication data (e.g., data encoded in an authentication code, packetized information provided from an authentication terminal, etc.). In one embodiment, for instance, an authentication code may include encoding such that a payment network 920 recognizes the encoding as corresponding to an authentication transaction and not a payment transaction. In some aspects, the processing network may determine whether a transaction reflects a particular transaction type based off packet information associated with the transaction (e.g., header information, footer information, data encoded in the packet, etc.). For example, and as described above, a value of an identifier or other code (e.g., as assigned by authentication terminal 152) included within the header information, footer information, and/or data encoded in the packet may indicate a particular transaction type (e.g., an authentication or payment transaction) associated with the authentication data.

In some embodiments, computing systems associated with payment network 920 may be configured to route the transaction (and/or information associated with the transaction such as authentication data, packetized information, etc.) to an appropriate party system based on a determined transaction type (e.g., as determined by an authentication terminal 152, payment network 920, another component of environment 1000, etc.). For example, as depicted in FIG. 10, payment network 920 may be configured to route a transaction associated with a payment transaction to a payment processing system 1012 associated with a payment entity 1010. In certain aspects, the payment processing system 1012 may process the payment transaction consistent with the disclosed embodiments. Similarly, in some aspects, payment network 920 may be configured route an authentication transaction to an appropriate authentication partner system for processing consistent with the disclosed embodiments (e.g., validation processes, authentication processes, etc.). For example, as shown in FIG. 10, payment network 920 may be configured to route an authentication transaction to an authentication partner system (e.g., system 132) for validation purposes, and in turn route the subsequent validation information to another authentication partner system (e.g., system 142) associated with an authentication partner. In some embodiments, systems associated with payment network 920 (or an authentication network 120) may be configured to modify information associated with a transaction (e.g., authentication data, packetized structures, etc.) consistent with the disclosed embodiments (e.g., appending, prepending, inserting, or modifying information in a packet structure, providing its own authentication or validation data, etc.).

In some aspects, an authentication partner system (e.g., system 132 or 142) may be configured to interpret, process, and modify information associated with authentication and payment transactions to perform processes consistent with the disclosed embodiments. In certain embodiments, for example, an authentication partner system may be configured to determine whether information it receives (e.g., authentication data) reflects an authentication transaction or payment transaction. In some embodiments, the authentication partner system may be configured to make this determination based on the nature of the information it receives (e.g., the authentication data, packetized information, etc.) in a manner consistent with the disclosed embodiments. For example, in one embodiment, an authentication partner system may determine the nature of a transaction based on headers, footers, or other data associated with packetized data, data encoded in an authentication code, values of transaction-type-specific identifiers, codes, and other data included within portions of the packetized data, other authentication data, and the like.

In certain aspects, an authentication partner system may be configured to modify, add, delete, or change information for processes consistent with the disclosed embodiments. For example, in one embodiment, an authentication partner system that validates an authentication transaction (e.g., a validating partner system) may be configured to generate data (e.g., validation information) incorporating the nature of the transaction it processed. In certain embodiments, the generated information may specify the nature of the transaction and other information such as, for example, the identity of the system to which payment network 920 should route the information. For example, in one aspect, an authentication partner system may be configured to specify an authenticating partner system associated with the authentication transaction so that payment network 920 will route validation information to the appropriate system. In another example, an authentication partner system may specify another validating partner system so that, for example, several systems validate a particular transaction. In some embodiments, authentication partner systems may modify or add information specifying the type of transaction and other information (e.g., the system to which a network should route the information) in any manner consistent with the disclosed embodiments.

In certain embodiments, an authentication partner system (e.g., system 132) may be configured to reject, return, or modify a transaction (or information associated therewith) if it determines that the transaction represents a payment transaction. For example, if an authentication partner system determines that a transaction reflects a payment transaction, the system may provide the information back to the processing network (e.g., payment network 920), reject the transaction, or modify the transaction information to specify the appropriate system for processing the transaction (e.g., the appropriate payment processing system). Similarly, in some embodiments, payment processing system 1012 may be configured to reject, return, or modify a transaction if it determines that the transaction reflects an authentication transaction. In some aspects, a determining system (e.g., payment processing system 1012, an authentication partner system, etc.) may not reject, return, or modify a transaction if it determines that the transaction represents a particular transaction. For example, in one embodiment, an authentication partner system and payment processing system may subsist in the same system or be associated with the same entity (e.g., payment entity 1010), in which case it may be configured to not reject, return, or modify the transaction based on a determined transaction type.

FIG. 11 depicts an exemplary multi-network environment 1100 consistent with the disclosed embodiments. In one aspect, environment 1100 may include one or more client devices (e.g., client device 112), which may be associated with respective one or more users (e.g., user 110). Environment 1100 may also include one or more authentication partner systems (e.g., systems 132 and 142), which may be associated with respective one or more authentication partners (e.g., partners 130 and 140). Further, environment 1100 may also include one or more authentication terminals (e.g., authentication terminal 152) associated with corresponding hosts (e.g., host 150), and one or more connections (e.g., connection 902) facilitating information transfer between the client devices and authentication terminals. In some aspects, environment 1100 may include one or more payment processing systems (e.g., system 1012) associated with corresponding payment entities (e.g., entity 1010), one or more payment networks (e.g., payment network 920) connecting one or more of the components of environment 1100, and one or more authentication networks (e.g., authentication network 120) connecting the components of environment 1100. In some embodiments, payment network 920 and authentication network 120 may be in communication with each other, although such communication is not required. For example, in one aspect, payment network 920 and authentication network 120 may comprise separate networks that do not communicate with one another.

The components of environment 1100 may include or implement any of the systems, technologies, processes, information, and functionalities consistent with the disclosed embodiments (e.g., consistent with the embodiments disclosed in connection with FIGS. 1-10). In some aspects, for example, the components of environment 1100 may be configured to receive information associated with a transaction (e.g., authentication data, packetized information, etc.) and determine whether the transaction reflects an authentication transaction or a payment transaction. In certain aspects, the determination whether a transaction reflects a particular transaction type may take place in any component of environment 1100 consistent with the disclosed embodiments (e.g., at authentication terminal 152, an authentication partner system, systems associated with payment network 920 and/or authentication network 120, etc.).

For example, in one embodiment, authentication terminal 152 may perform processes consistent with the disclosed embodiments to receive information associated with a transaction (e.g., authentication data, packetized information, etc.) and determine whether the transaction reflects an authentication transaction or a payment transaction. In some aspects, authentication terminal 152 may be configured to provide the information associated with the transaction to one or more networks based on the determined transaction type. For example, in some embodiments, authentication terminal 152 may be configured to route information associated with a payment transaction to payment network 920. In another example, authentication terminal 152 may be configured to route information associated with an authentication transaction to an authentication network 120. Systems associated with the receiving network (e.g., payment network 920, authentication network 120, etc.) and those in connection with the receiving network (e.g., authentication partner systems, payment processing system 1012, etc.) may be configured to receive the information and process the information consistent with the disclosed embodiments. For example, payment processing system 1012 may be configured to receive and process payment transactions consistent with the disclosed embodiments, and authentication partner systems (e.g., systems 132 and 142) may be configured to validate and/or authenticate authentication transactions consistent with the disclosed embodiments.

In certain aspects, other systems in environment 1100 may be configured to determine whether a particular transaction (and/or any information or process deriving therefrom) reflects an authentication or payment transaction to conduct processes consistent with the disclosed embodiments. For example, in one aspect, payment processing system 1012 and/or an authentication partner system (e.g., system 132) may be configured to receive information and determine a particular transaction type associated with the information using any of the exemplary techniques outlined above. In some aspects, the receiving system may be configured to process certain transactions and/or reject, return, or modify other transactions based on the determined transaction type. For example, if an authentication partner system determines that information it receives reflects a payment transaction, the authentication partner system may return, reject, or modify the transaction to, for instance, provide the information back to authentication network 120, which may in turn be configured to provide the information to payment network 920 or transaction terminal 152 for processing along the appropriate channels.

Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

For example, the disclosed embodiments may be configured to perform processes that enable a financial service provider to open a new account for a customer (e.g., user 110) without requiring the customer to establish their identity at a brick and mortar financial service provider location. For instance, a user (e.g., user 110) that may be moving from California to Virginia (or from another country to Virginia) may wish to open a new financial account with a financial service provider that provides services in Virginia. The disclosed embodiments may be configured to allow the user, prior to the move, and via a client device (e.g., device 112) and other components of FIGS. 1 and/or 9, to perform operations that provide an authentication code to the client device of the user. Following the move, he/she may provide authentication data to an authentication terminal (e.g., terminal 152 located, for example, at an airport, gas station, or train station) to request authentication and facilitate the opening of the new financial account. The disclosed embodiments may perform processes consistent with those disclosed herein to provide authentication confirmation to the client device, and allow the financial service provider to open the new financial account for the user, without requiring the user to visit a branch or other type of brick and mortar location to show proof of identity or similar identity information.

The disclosed embodiments may be similarly performed in other applications, such as where a parent would like to open a bank account for their child who is attending college in another country, state, etc. For example, the disclosed embodiments may allow a parent living in Texas to open a bank account for a child attending the University of Oxford in the United Kingdom. The disclosed embodiments may be configured to allow the parent, via a client device (e.g., device 112), to request a British bank to open a checking account for her child (e.g., by providing input to a website or mobile application hosted by the bank). The disclosed embodiments may provide an authentication code to the parent and/or child (e.g., as part of an e-mail, a mailed card, etc.), and may allow the British bank or parent to specify one or more physical locations at which to provide the authentication code (e.g., at authentication terminals 152 located at a particular airport, within a certain geographical region in the United Kingdom, etc.). The parent may provide the authentication code to an authentication terminal 152 (e.g., via scanning a piece of paper on which the code has been printed, scanning a client device displaying the code, etc.) at the designated location, and swipe her bank card (e.g., a debit card) at the terminal to provide additional authentication data. The disclosed embodiments may be configured to receive the scanned code, information associated with the bank card, and other authentication data (e.g., the child's fingerprints via a biometric scanner), and perform processes to validate and authenticate the transaction. The disclosed embodiments may thus allow a parent to open a British bank account for her child before the child ever steps foot into the United Kingdom.

In another example, the disclosed embodiments may be configured to perform processes enabling a governmental entity (e.g., a DMV, the U.S. State Department, a court, etc.) to create or renew for a government-issued document (e.g., a passport, a driver's license, a hunting license, a concealed carry permit, etc.) without receiving user credentials at a brick and mortar government location. For example, the disclosed embodiments may be configured to perform processes allowing a user to register for a passport at a convenient location such as a library, grocery store, bank, or parking garage with minimal documentation. The disclosed embodiments may be configured to allow the user to perform operations that provide, via components of FIGS. 1 and/or 9, an authentication code to user (e.g., on a client device 112, on a card, etc.), and may allow the user to input the authentication code at a convenient terminal (e.g., terminal 152). The disclosed embodiments may permit the terminal to read the authentication code, determine the partner system generating the code, and determine the required authentication data required to complete the authentication transaction.

In this example, for instance, the terminal may be configured to recognize a passport registration as originating from the U.S. State Department, and may determine that a passport registration transaction requires certain baseline information (e.g., the user's social-security number (SSN), driver's license number, and thumbprint, etc.). The disclosed embodiments may allow the terminal to prompt the user for the baseline information and transmit the baseline information to a validating partner system connected to the authentication network. The disclosed embodiments may allow the validating partner system to perform processes to obtain copies of the user's birth certificate, photo identification, and other required documents (e.g., from other computing systems connected to the authentication network), and validate the transaction as disclosed herein. The disclosed embodiments may be configured to allow the authenticating partner system to receive the validation to approve the transaction, and thereby register the user for a passport without requiring the user to bring physical copies of certain documents (e.g., his birth certificate or photo ID) to a government location.

The disclosed embodiments may be configured to perform processes enabling the providing and receiving of additional confirmations and processes based therefrom. For example, the disclosed embodiments may be configured to provide a notification to an authentication terminal 152 or client device 112 (e.g., over authentication network 120), reflecting whether a validating partner system is able or authorized (e.g., based on validation conditions, authentication conditions, government regulations, internal company standards, etc.) to validate a particular transaction for given received authentication data. The disclosed embodiments may be configured to notify the relevant computing system whether the validating partner system is able or authorized to validate the transaction, and/or prompt a user or operator for additional or alternative authentication data (e.g., another license) to complete the transaction.

In another example, the disclosed embodiments may be configured to perform processes for requesting additional or alternative information from a user when an authentication transaction has not been approved. For example, the disclosed embodiments may be configured to perform processes that prompt a user (e.g., via client device 112, terminal 152, etc.) for additional or alternative authentication data (e.g., another license, swiping another transaction card, entering another PIN, etc.) to perform authentication and/or validation processes consistent with the disclosed embodiments.

The disclosed embodiments may be configured to perform processes that enable fee payments to the various computing components of FIGS. 1 and/or 9. For example, the disclosed embodiments may be configured to perform processes that provide payments to an authentication terminal 152, validating partner system (e.g., system 142), and/or authenticating partner system (e.g., system 132) for authentication processes and/or validation processes. In one example, an authentication terminal 152 may be configured to receive a payment from a user or authentication partner system upon authenticating a user, providing authentication data to an authentication network 120, obtaining validation data from an authentication partner, or any other process disclosed herein. In another example, a validating partner system may be configured to charge and receive payments for obtaining validation data from other authentication partner systems, generating validation information, providing validation data and/or validation information to the authentication network, or the like.

The disclosed embodiments may be configured to perform processes providing enhanced convenience features for customers. For example, the disclosed embodiments may be configured to perform processes that determine a user's location and, upon receiving an authentication transaction request, provide the user with a list of nearby terminals at which the user may provide information to an authentication network. In one example, a user may provide an authentication transaction request while pumping gas (e.g., via client device 112). The disclosed embodiments may be configured to perform operations that determine the user's location, determine the nature of the authentication transaction request, and provide the user (e.g., over client device 112) with a map of the user's surroundings and locations of nearby terminals.

While certain aspects of the foregoing embodiments have been described with reference to different system names, the disclosed embodiments do not require these systems to be distinct. For example, an authentication terminal 152 may be configured to receive and/or obtain validation data from another computing system connected to the network (e.g., system 132), or may store validation data within its own databases and data repositories. In this example, the authentication terminal may perform processes consistent with both authentication terminals and validation partner systems to validate an authentication transaction. In another example, an authenticating partner system may be configured to obtain validation data from other network systems (e.g., a database associated with an authentication terminal), thereby combining the functionalities of both authenticating and validating partner systems.

What is claimed is:

1. A system, comprising:
    a communications interface;
    a memory storing software instructions; and
    one or more processors coupled to the memory and the communications interface, the one or more processors configured to execute the software instructions to perform one or more operations, the operations comprising:
        generating and transmitting, via the communications interface, a first signal to a first authentication partner system, the first signal comprising a request to authenticate an identity of a user involved in an authentication transaction initiated by the system;
        receiving a second signal via the communications interface, the second signal comprising an authentication code generated by the first authentication partner system, the authentication code being representative of the request;
        generating and transmitting, via the communications interface, a third signal to an authentication terminal device in communication with an authentication network, the third signal comprising authentication data that includes the authentication code, and the authentication terminal device being configured to transmit a portion of the authentication data to a second authentication partner system; and
        receiving, via the communications interface, a fourth signal from the first authentication partner system, the fourth signal comprising confirmation data that reflects an approval, by the first authentication partner system, of the authentication transaction based on an application of at least one of an authorization condition to the authentication code or a validation condition to validation data generated by the second authentication partner system,
    wherein the second authentication system is configured to validate the authentication transaction based on a comparison between the authentication data and prior transaction data characterizing one or more prior authentication transactions involving the user or initiated by the client device, generate the validation data, and transmit the authentication code and the validation data to the first authentication partner system, the validation data reflecting the validated authorization transaction.

2. The system of claim 1, wherein:
    the request comprises data associated with the user;
    the data associated with the user includes at least one of: personal information, government-issued identifying information, or device information identifying the system providing the authentication data; and
    the authentication code is representative of the data associated with the user.

3. The system of claim 1, wherein the authentication and validation conditions specifying one or more circumstances in which the authentication transaction will be approved by the first authentication partner system.

4. The system of claim 1, wherein the authentication code includes at least one of an alphanumeric code, visual code, or biometric code.

5. The system of claim 4, wherein the authentication code includes routing encoding, the routing encoding specifying the second authentication partner system in communication with the authentication network.

6. The system of claim 1, wherein the operations further comprise receiving a list of authentication terminals authorized to process the authentication code.

7. A system terminal, comprising:
    a communications interface;
    a memory storing software instructions; and
    one or more processors coupled to the memory and the communications interface, the one or more processors configured to execute the software instructions to perform one or more operations, the operations comprising:
        receiving a first signal via the communications interface, the first signal comprising first authentication data that includes an authentication code corresponding to an authentication transaction, the authentication code being generated by a first authentication partner system, and the first signal being generated by a client device, and the client device being configured to initiate the authentication transaction;
        receiving transaction information specifying a transaction type associated with the first set of authentication data;

determining a second authentication partner system based on the authentication code and the transaction information, the second authentication partner system being configured to validate the authentication transaction based on a portion of the first authentication data;

generating and transmitting, via the communications interface, a second signal that includes the first authentication data to the second authentication partner system; and receiving a third signal from the first authentication partner system via the communications interface, the third signal comprising confirmation data reflecting an approval of the authentication transaction by the first authentication partner system based on an application of at least one of an authorization condition to the authentication code or a validation condition to validation data generated by the second authentication partner system, wherein the second authentication system is configured to validate the authentication transaction based on a comparison between the authentication data and prior transaction data characterizing one or more prior authentication transactions involving the user or initiated by the client device, to generate the validation data, and to transmit the authentication code and the validation data to the first authentication partner system, the validation data reflecting the validated authentication transaction.

8. The system terminal of claim 7, wherein the operations further comprise generating and transmitting, via the communications interface, a fourth signal that includes the confirmation data to the client device.

9. The system terminal of claim 7, wherein:
the first authentication data is associated with a user of the client device; and
the operations further comprise:
receiving second authentication data associated with the user, the second authentication data corresponding to the authentication transaction;
determining the second authentication partner system based in part on the second set of authentication data; and
generating and transmitting, via the communications interface, a fourth signal that includes the second authentication data to the second authentication partner system, the second authentication partner system being configured to validate the authentication transaction based on portions of the first and second authentication data.

10. The system terminal of claim 9, wherein at least one of the first authentication data or the second authentication data includes at least one of:
a personal identification number associated with the user;
account information corresponding to an account associated with a user;
time data reflecting a time of a transaction event, wherein the transaction event relates to one of receiving the first authentication data, receiving the second of authentication data, receiving the transaction information, generating and transmitting the second signal that includes the first authentication data, generating and transmitting the fourth signal that includes the second authentication data, or providing the transaction information to the second authentication partner system;
location data reflecting a location of the transaction event;
entity data reflecting a particular entity associated with the system terminal; or
entity type data reflecting a type of entity associated with the system terminal.

11. The system terminal of claim 7, wherein the transaction information is included in the first authentication data.

12. The system terminal of claim 7, wherein the transaction information is encoded in the authentication code.

13. The system of terminal claim 7, wherein the first set of authentication data is received from the client device.

14. The system terminal of claim 9, wherein the operations further include:
modifying at least one of the first authentication data or the second authentication data based on the transaction information to create modified transaction data; and
providing the modified transaction data to the second authentication partner system, the second authentication partner system being configured to validate the authentication transaction based on a portion of the modified authentication data.

15. The system terminal of claim 9, wherein the system terminal comprises a point-of-sale terminal connected to an authentication network.

16. A system, comprising:
a communications interface;
a memory storing software instructions; and
one or more processors coupled to the memory and the communications interface, the one or more processors configured to execute the software instructions to perform one or more operations, the operations comprising:
receiving a first signal via the communications interface, the first signal comprising a request to authenticate an identity of a user involved in an authentication transaction, the request being initiated at a client device and comprising data associated with the user;
generating an authentication code that represents the request, and storing the authentication code and the request within a portion of the memory;
generating and transmitting, via the communications interface, a second signal that includes the authentication code to the client device, the client device being configured to transmit the authentication code to a terminal device, and the terminal device being configured to transmit authentication data that includes the authentication code to an authentication partner system;
receiving a third signal from the authentication partner system via the communications interface, the third signal comprising (i) the authentication code that represents the request and (ii) validation data indicative of a validation of the authentication transaction by the authentication partner system;
approving the authentication transaction based on an application of at least one of an authorization condition to the received authentication code or a validation condition to the received validation data; and
generating and transmitting, via the communications interface, a fourth signal to the client device, the fourth signal comprising confirmation data reflecting the determined approval,
wherein the authentication partner system is configured to validate the authentication transaction based on a comparison between the authentication data and prior transaction data characterizing one or more prior authentication transactions involving the user or initiated by the client device, generate the validation data, and transmit the authentication code and the validation data to the system.

17. The system of claim 16, wherein:

the client device is operated by the user; and the operations further comprise:
- determining a correspondence between the received and stored authentication codes; and
- approving the user for the authentication transaction based on the determined correspondence and the received validation data.

* * * * *